United States Patent
Tanaka et al.

(10) Patent No.: US 6,681,082 B1
(45) Date of Patent: Jan. 20, 2004

(54) WAVELENGTH DIVISION MULTIPLEXING OPTICAL TRANSMISSION SYSTEM, OPTICAL AMPLIFIER AND DISPERSION COMPENSATOR

(75) Inventors: Toshiki Tanaka, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/494,529

(22) Filed: Jan. 31, 2000

(30) Foreign Application Priority Data

Apr. 12, 1999 (JP) .......................................... 11-104158

(51) Int. Cl.$^7$ .......................... H04B 10/16; H04J 14/02
(52) U.S. Cl. .......................... 398/158; 398/68; 398/81; 398/97; 398/159; 398/160
(58) Field of Search ................................ 359/124, 153, 359/161, 173; 398/68, 81, 97, 158, 159, 160

(56) References Cited

U.S. PATENT DOCUMENTS

| | | | | |
|---|---|---|---|---|
| 5,696,614 A | * | 12/1997 | Ishikawa et al. | 359/124 |
| 5,886,804 A | * | 3/1999 | Onaka et al. | 359/161 |
| 5,995,694 A | * | 11/1999 | Akasaka et al. | 385/123 |
| 6,178,279 B1 | * | 1/2001 | Mukasa et al. | 385/123 |
| 6,188,823 B1 | * | 2/2001 | Ma | 385/123 |
| 6,243,176 B1 | * | 6/2001 | Ishikawa et al. | 359/124 |
| 6,263,138 B1 | * | 7/2001 | Sillard et al. | 385/123 |
| 6,324,317 B1 | * | 11/2001 | Tanaka et al. | 385/24 |

OTHER PUBLICATIONS

"Wavelength Division Multiplexing in Long–Haul Transmission Systems," N.S. Bergano, et al., IEEE Journal of Lightwave Technology, vol. 14, No. 6, pp. 1299–1308.

"Quarter Terabit (25×10 Gb/s) over 9288 km WDM Transmission Experiment Using Nonlinear Supported RZ Pulse in Higher Order Fiber Dispersion Managed Line," M. Murakami et al., ECOC '98, 20–24, pp. 79–81.

"Ultra–wide Band, Long Distance WDM Transmission Demonstration: 1 Tb/s (50×20 Gb/s), 600 km Transmission Using 1550 and 1580 nm Wavelength Bands," W. Aisawa et al., OFC '98, PD11, pp. 1–4.

"765 Gb/s over 2,000 km Transmission Using C–and L–Band Erbium Doped Fiber Amplifiers", Matthew X. Ma, et al., OFC '99, PD 16, pp. 1–3.

"Fiber Raman Amplifier for 1520nm Band WDM Transmission," Kani et al., Electeronic Information Communication Academy Communication Society Congress, B–10–160.

"Fiber Bragg Gratings for Dispersion Compensation," Richard L. Laming et al., OECC '97, Technical Digest, 9D1–1, pp. 206–207.

"Fiber Bragg Gratings for Dispersion Compensation," Sudo et al. Electeronic Information Communication Academy Electronics Society Congress, C–3–47.

* cited by examiner

Primary Examiner—Leslie Pascal
Assistant Examiner—Dzung Tran
(74) Attorney, Agent, or Firm—Staas & Halsey LLP

(57) ABSTRACT

The present invention has an object to provide a WDM optical transmission system for effectively compensating such as wavelength dispersions of respective wavelength bands, by a simple constitution making use of a hybrid transmission path in case of transmitting a broadband WDM signal light containing a plurality of wavelength bands. To this end, wavelength dispersion characteristics of a hybrid transmission path utilizing a 1.3 $\mu$m zero-dispersion SMF and an RDF in the present WDM optical transmission system, are set such that compensation ratios of wavelength dispersion and dispersion slope become approximately 100% for a reference wavelength band which is one of a plurality of wavelength bands; and dispersion compensation fibers capable of compensating wavelength dispersions caused within the hybrid transmission path are inserted into propagation paths, respectively, within an optical amplifier, for the wavelength bands except for the reference wavelength band. In this way, wavelength dispersion compensation for the plurality of wavelength bands can be assuredly performed with a simple constitution.

21 Claims, 19 Drawing Sheets

WAVELENGTH DIVISION MULTIPLEXING OPTICAL TRANSMISSION SYSTEM, OPTICAL AMPLIFIER AND DISPERSION COMPENSATOR

BACKGROUND OF THE INVENTION

1. Field of the Invention

The present invention relates to a wavelength division multiplexing optical transmission system for transmitting wavelength division multiplexed (WDM) signal light, as well as to an optical amplifier and a dispersion compensator both applicable to such a system; and more particularly to a wavelength division multiplexing optical transmission system, optical amplifier and dispersion compensator adapted to utilize a hybrid transmission path comprising combined optical fibers having wavelength dispersion characteristics conflicting with each other, so as to effectively compensate wavelength dispersions of respective wavelength bands, in case of transmitting broadband wavelength division multiplexed signal light containing a plurality of wavelength bands.

2. Related Art

Conventionally, there has been performed transmission of an optical signal, by utilizing an optical regenerating repeater which converts an optical signal into an electric signal to thereby perform retiming, reshaping and regenerating. At present, however, practical use of an optical amplifier has been advanced, so that there is being investigated an optical amplifying-and-repeating transmission method which adopts an optical amplifier as a linear repeater. By substituting an optical regenerating repeater with an optical amplifying repeater, it is expected that the number of parts within the repeater is remarkably reduced to thereby ensure reliability and permit cost reduction. Further, as one method for realizing a large capacity of an optical transmission system, attention has been directed to a wavelength division multiplexing (WDM) optical transmission method which multiplexes two or more optical signals having wavelengths different from each other to transmit within a transmission path.

In a WDM optical amplifying-and-repeating transmission method obtained by combining the aforementioned optical amplifying-and-repeating transmission method and WDM optical transmission method, it is possible to collectively amplify WDM signal lights making use of an optical amplifier, to thereby permit realization of large capacity and long distance transmission with a simple (economic) constitution.

In the conventional WDM optical amplifying-and-repeating transmission system (hereinafter abbreviated to "WDM optical transmission system"), there is used a method for managing a wavelength dispersion of a transmission path, so as to reduce transmission characteristic degradation due to non-linear effect of a transmission path.

For example, in an article "Wavelength Division Multiplexing in Long-Haul Transmission Systems, IEEE Journal of Lightwave Technology. vol. 14, No. 6, pp. 1299–1308, 1996" of N. S. Bergano et al., there is used a transmission path obtained by combining: a dispersion-shifted fiber (DSF) of a length of about 900 km having a zero-dispersion wavelength of 1585 nm and a positive wavelength dispersion slope; with a single mode fiber (SMF) of a length of about 100km having a zero-dispersion wavelength of 1310 nm and a positive wavelength dispersion slope. This transmission path has an averaged zero-dispersion wavelength of about 1558 nm, and accommodates wavelengths of signal lights ranging from 1556 nm to 1560 nm.

Wavelength dispersions of DSF and SMF are approximately −2 ps/nm/km and +20 ps/nm/km, respectively, in which a group velocity of signal light and spontaneous emission light and a group velocity of mutual signal lights are different from each other. Thus, by adopting a transmission path obtained by combining DSF and SMF, it becomes possible to shorten an interaction period of time of non-linear effect, and to reduce degradation of a transmission characteristic such as due to four wave mixing (FWM) and a cross phase modulation (XPM). Further, since the transmission path has the averaged zero-dispersion wavelength within a signal light wavelength, there is also reduced a degradation of transmission characteristic due to self phase modulation (SPM) and wavelength dispersion.

However, when it is required to expand a transmission band to thereby increase a capacity of a WDM optical transmission system, it will be difficult to compensate such that wavelength dispersions become zero for all signal light wavelengths in the above described constitution, because of an affection of wavelength dispersion slope. As such, there are necessarily caused degradations of signal light waveforms due to interaction between: wavelength dispersion which is not compensated but accumulated; and non-linear effect within an optical fiber.

As a countermeasure for such a situation, there has been proposed a transmission path having a latter stage of a transmission section thereof applied with a dispersion compensation fiber for compensating wavelength dispersions and dispersion slopes thereof caused in a former stage of the transmission section. Concretely, it has been proposed to reduce dispersion slope to thereby reduce accumulated wavelength dispersions so as to reduce a degradation of a transmission characteristic, by adopting: for a former stage of a transmission section, a 1.3 μm zero-dispersion SMF having a positive wavelength dispersion and a positive dispersion slope; and for a latter stage of the transmission section, a dispersion compensation fiber having a negative wavelength dispersion and a negative dispersion slope, which compensates the wavelength dispersion and dispersion slope of the 1.3 μm zero-dispersion fiber.

In an article "Quarter terabit (25×10 Gb/s) over 9288 km WDM transmission experiment using nonlinear supported RZ pulse in higher order fiber dispersion managed line, ECOC '98, pp. 79–81, 1998" of M. Murakami et al., it has been permitted to reduce an averaged wavelength dispersion slope up to 0.0067 ps/nm$^2$/km, by adopting: for a former section of a transmission section, a 1.3 μm zero-dispersion fiber of a 50% length of the transmission section having a positive wavelength dispersion; and for a latter stage of the transmission section, a dispersion compensation fiber of a 50% length of the transmission section having a negative wavelength dispersion.

There has been recently further proposed an optical transmission technique adopting WDM signal light including a plurality of wavelength bands such as 1550 nm band and 1580 nm, so as to increase a transmission capacity of a WDM optical transmission system.

According to, for example, an article "Ultra-wide band, long distance WDM transmission demonstration: 1 Tb/s (50×20 Gb/s), 600km transmission using 1550 and 1580 nm wavelength bands, PD11, OFC '98, 1998" of S. Aisawa, it has been permitted to increase a transmission capacity by adopting WDM signal lights of two wavelength bands, 1550 nm band and 1580 nm band, to thereby allow 50 waves of signal lights to be multiplexed. Here, since the wavelength dispersions and the dispersion slopes accumulated within SMF transmission path are different from each other for the respective wavelength bands, respectively, there are inserted dispersion compensators for compensating wavelength dispersions and dispersion slopes in the respective wavelength bands, into optical amplifiers linked in multiple stages, respectively. Each of the optical amplifiers has a constitution to demultiplex the input WDM signal lights in each of wavelength bands, and to send the demultiplexed WDM signal lights of each of the wavelength bands to each of corresponding dispersion compensators so as to compensate wavelength dispersion and dispersion slope caused within the SMF transmission path for each of wavelength bands. In this way, there is reduced a degradation of transmission characteristic of WDM signal lights in both wavelength bands of 1550 nm band and 1580 nm band.

Further, there has been proposed a technique for transmitting WDM signal light of a plurality of wavelength bands, making use of a hybrid transmission path obtained by combining a plurality of optical fibers having wavelength dispersion characteristics different from each other such as described above.

For example, in an article "765 Gb/s over 2,000 km Transmission Using C- and L-band Erbium Doped Fiber Amplifiers, PD16-1, OFC '99, 1999" of Mattehw X. Ma et al., there has been disclosed a technique for repeatingly transmitting WDM signal lights of 1550 nm band and 1580 nm band, making use of a hybrid transmission path obtained by combining a normal optical fiber (SMF), a dispersion-shifted fiber (NZ-DF) and a dispersion compensation fiber (DCF). In this technique, there are used, as transmission path, three types of optical fibers having wavelength dispersion characteristics different from one another, so as to reduce an averaged dispersion slope over two wavelength bands, and so as to perform dispersion compensation of demultiplexed WDM signal lights for each of the wavelength bands, to thereby realize a long distance transmission of WDM signal lights of 1550 nm band and 1580 nm band.

However, in a conventional WDM optical transmission system for transmitting WDM signal light having a plurality of wavelength bands as described above, it becomes necessary to compensate the accumulated wavelength dispersion and the dispersion slope for each of wavelength bands for a broadband WDM signal light. As such, there have been problematically complicated such as optical amplifiers provided with dispersion compensators corresponding to respective wavelength bands, thereby leading to higher cost.

Further, wavelength dispersion accumulated in a transmission path adopting a normal SMF has a positive value for a wavelength band such as 1550 nm band and 1580 nm band. As such, dispersion compensation fiber such as provided in an optical amplifier for each of wavelength bands is required to have a negative wavelength dispersion. However, because a modular dispersion compensation fiber, which has such a negative wavelength dispersion and is to be provided within an optical amplifier, has a mode field diameter smaller than that of a normal SMF, there is such a defect that: the broader the band of WDM signal light is, the more susceptively the WDM signal light is affected by non-linear effect.

In the above described conventional method for compensating wavelength dispersion, even when a hybrid transmission path is adopted to thereby reduce accumulation of wavelength dispersion and dispersion slope as described above, the compensation by the hybrid transmission path only is insufficient for a whole of broad wavelength band of WDM signal light, and it has been required to compensate wavelength dispersion for each of wavelength bands.

There will be now considered a system described in the above article of Matthew X. Ma et al.

As shown in a wavelength dispersion map of FIG. 34, upon calculating wavelength dispersions in one section (43.5 km) of a hybrid transmission path based on the description of the article, it is considered that there will be accumulated a positive wavelength dispersion in the order of about 7 ps/nm for a shortest wavelength (1529.6 nm) and in the order of about 50 ps/nm for a longest wavelength (1600 nm). Further, the FIG. 1 of the article shows a wavelength dispersion map of a whole transmission section (2000 km) for a 1550 nm band, which map exhibits that there are accumulated a positive wavelength dispersion in the order of about 500 ps/nm in the channel 1 (shortest wavelength of 1550 nm band) and about 2,000 ps/nm in the channel 50 (longest wavelength of 1550 nm band). In this way, there are accumulated positive wavelength dispersions for respective wavelength bands, even when a hybrid transmission path is adopted so as to compensate wavelength dispersion and dispersion slope. This appears to be why dispersion compensators having negative wavelength dispersions are provided in an optical amplifier corresponding to respective wavelength bands, so as to compensate the accumulated wavelength dispersions to be zero. There is thus caused such a problem in this case that the optical amplifier is complicated to lead to higher cost, and is susceptible to a non-linear effect.

SUMMARY OF THE INVENTION

The present invention has been carried out in view of the conventional problems as described above, and it is therefore an object of the present invention to provide a WDM optical transmission system for effectively compensating such as wavelength dispersions of respective wavelength bands by a simple constitution making use of a hybrid transmission path in case of transmitting broadband WDM signal light containing a plurality of wavelength bands, to thereby realize excellent transmission characteristics.

To achieve the above object, according to one aspect of the present invention, a wavelength division multiplexing optical transmission system for transmitting wavelength division multiplexed signal light including a plurality of wavelength bands comprises: an optical transmission path comprising a first transmission section provided by connecting: a first optical fiber having positive wavelength dispersions and positive dispersion slopes relative to the plurality of wavelength bands, respectively; and a second optical fiber having negative wavelength dispersions and negative dispersion slopes relative to the plurality of wavelength bands, respectively; the first transmission section having wavelength dispersion characteristics set such that compensation ratios by the second optical fiber for wavelength dispersions and dispersion slopes caused within the first optical fiber become maximum for a reference wavelength band which is one of the plurality of wavelength bands; and a dispersion compensation device capable of compensating wavelength dispersions caused within the first transmission section of the optical transmission path, for the plurality of wavelength bands except for the reference wavelength band.

According to the WDM optical transmission system having such a constitution, the WDM signal light including the plurality of wavelength bands is transmitted through the first transmission section of the optical transmission path, so that wavelength dispersions and dispersion slopes caused within the first optical fiber are compensated by the second optical fiber. The compensation ratios are set to be maximum for the reference wavelength band to thereby fully perform wavelength dispersion compensation for the reference wavelength band. However, compensation errors for those wavelength bands except for the reference wavelength band become large, so that wavelength dispersions and dispersion slopes will remain. Nonetheless, the residues of at least wavelength dispersions (and of dispersion slopes, depending on setting of the first transmission section) are compensated by the dispersion compensation device for each of the wavelength bands except for the reference wavelength band. In this way, dispersion compensations for the plurality of wavelength bands can be assuredly performed by a simple constitution, to thereby allow cost reduction in a WDM optical transmission system.

According to another aspect of the present invention, a wavelength division multiplexing optical transmission system for transmitting wavelength division multiplexed signal light including a plurality of wavelength bands comprises: an optical transmission path comprising a first transmission section provided by connecting: a first optical fiber having positive wavelength dispersions and positive dispersion slopes relative to the plurality of wavelength bands, respectively; and a second optical fiber having negative wavelength dispersions and negative dispersion slopes relative to the plurality of wavelength bands, respectively; the first transmission section having wavelength dispersion characteristics set such that compensation ratios by the second optical fiber for wavelength dispersions caused within the first optical fiber become approximately 100% for a central wavelength of a shortest wavelength band and for a central wavelength of a longest wavelength band of the plurality of wavelength bands, respectively. The wavelength division multiplexing optical transmission system may further comprise a dispersion compensation device for compensating wavelength dispersions caused within the first transmission section of the optical transmission path, for intermediate wavelength bands positioned between the shortest wavelength band and the longest wavelength band.

According to the WDM optical transmission system having such a constitution, the compensation ratios within the first transmission section of the optical transmission path become approximately 100% for a central wavelength of a shortest wavelength band and for a central wavelength of a longest wavelength band of the plurality of wavelength bands, respectively. Thus, wavelength dispersions for the central wavelengths become approximately zero. At this time, for dispersion slopes, approximately 100% of compensation is realized near a wavelength band intermediate between the shortest wavelength band and the longest wavelength band, but slight compensation errors are caused at the shortest wavelength band and the longest wavelength band. Nonetheless, these compensation errors of dispersion slopes can be regarded as being such degrees that have no affection on transmission characteristics, when considering band widths of respective wavelength bands. Thus, even without any dispersion compensations for the respective wavelength bands, there can be obtained satisfactory transmission characteristics for the plurality of wavelength bands. For the intermediate wavelength bands, there is caused such a possibility that wavelength dispersion compensations within the first transmission section become insufficient. Nonetheless, in such a situation, wavelength dispersion compensations for the plurality of wavelength bands can be realized by a simple constitution, by providing the dispersion compensation device which performs wavelength dispersion compensations for the intermediate wavelength bands only. In this way, it becomes possible to achieve cost reduction in a WDM optical transmission system.

According to yet another aspect of the present invention, a wavelength division multiplexing optical transmission system for transmitting wavelength division multiplexed signal light including a plurality of wavelength bands comprises: an optical transmission path comprising a first transmission section provided by connecting: a first optical fiber having positive wavelength dispersions and positive dispersion slopes relative to the plurality of wavelength bands, respectively; and a second optical fiber having negative wavelength dispersions and negative dispersion slopes relative to the plurality of wavelength bands, respectively; the first transmission section having wavelength dispersion characteristics set such that compensation ratios by the second optical fiber for wavelength dispersions caused within the first optical fiber become maximum for a reference wavelength band which is one of the plurality of wavelength bands; and a dispersion compensation device capable of compensating wavelength dispersions caused within the first transmission section of the optical transmission path, for the plurality of wavelength bands, respectively, except for the reference wavelength band.

According to the WDM optical transmission system having such a constitution, the compensation ratios only for wavelength dispersions within the first transmission section of the optical transmission path are set to become maximum for the reference wavelength band. Thus, compensation errors become larger for the wavelength bands except for the reference wavelength band, so that wavelength dispersions and dispersion slopes will remain. Nonetheless, the residues of at least wavelength dispersions (and of dispersion slopes, depending on setting of the first transmission section) are compensated by the dispersion compensation device for each of the wavelength bands except for the reference wavelength band.

According to still another aspect of the present invention, a wavelength division multiplexing optical transmission system comprises: an optical transmission path through which wavelength division multiplexed signal light including a plurality of wavelengths for communication is transmitted, the optical transmission path comprising: a first optical fiber having positive wavelength dispersions and positive dispersion slopes relative to the plurality of wavelength, respectively; and a second optical fiber having negative wavelength dispersions and negative dispersion slopes relative to the plurality of wavelength, respectively; the first optical fiber and the second optical fiber having wavelength dispersion characteristics set such that compensation ratios by the second optical fiber for wavelength dispersions and dispersion slopes caused within the first optical fiber become maximum for a reference wavelength which is one of the plurality of wavelengths; and a dispersion compensation device capable of compensating wavelength dispersions caused within the optical transmission path, for each of predetermined wavelength widths for the plurality of wavelengths, respectively.

According to the WDM optical transmission system having such a constitution, there can be compensated such as wavelength dispersions caused within the optical transmission path, by treating each of the predetermined wavelength widths as one unit, for the plurality of wavelengths for communication.

The present invention further provides an optical amplifier for amplifying wavelength division multiplexed signal light, the optical amplifier comprising: a demultiplexing part for separating wavelength division multiplexed signal lights from an optical transmission path, corresponding to respective wavelengths; optical amplifying parts for amplifying the lights of the respective wavelengths, separated by the demultiplexing part; dispersion compensation parts for performing dispersion compensations corresponding to wavelength dispersion values of the lights of the respective wavelengths, separated by the demultiplexing part; and a multiplexing part for wavelength-division multiplexing the lights of the respective wavelengths, which lights have been treated by the optical amplifying part and the dispersion compensation parts, respectively.

According to the optical amplifier having such a constitution, wavelength division multiplexed signal lights sent from the optical transmission path are demultiplexed by the demultiplexing part corresponding to the respective wavelengths, and the demultiplexed lights are sent to the optical amplifying parts and dispersion compensation parts. The demultiplexed lights of the respective wavelengths have wavelength dispersions corresponding to characteristics of the optical transmission path through which the lights have been propagated, respectively, and the dispersion compensation parts perform dispersion compensations corresponding to the wavelength dispersion values, respectively. The lights, which have been amplified by the optical amplifying parts and dispersions of which have been compensated by the dispersion compensation parts, are multiplexed by the multiplexing part into wavelength division multiplexed signal light.

The present invention also provides a dispersion compensator provided within an optical transmission path for transmitting wavelength division multiplexed signal lights, the compensator comprising: a demultiplexing part for separating wavelength division multiplexed signal lights from the optical transmission path, corresponding to respective wavelengths; and dispersion compensation parts for performing dispersion compensations corresponding to wavelength dispersion values of the lights of the respective wavelengths, separated by the demultiplexing part.

According to the dispersion compensator having such a constitution, wavelength division multiplexed signal lights from the optical transmission path are demultiplexed by the demultiplexing part corresponding to the respective wavelengths. The demultiplexed lights of the respective wavelengths have wavelength dispersions corresponding to characteristics of the optical transmission path through which the lights have been propagated, respectively, and the dispersion compensation parts perform dispersion compensations corresponding to the wavelength dispersion values, respectively.

Other objects, features and advantages of the present invention will become apparent from the following description about the embodiments in conjunction with the accompanying drawings.

DETAILED DESCRIPTION OF THE PREFERRED EMBODIMENT

There will be described hereinafter the embodiments according the present invention, with reference to the accompanying drawings.

Figure 1:
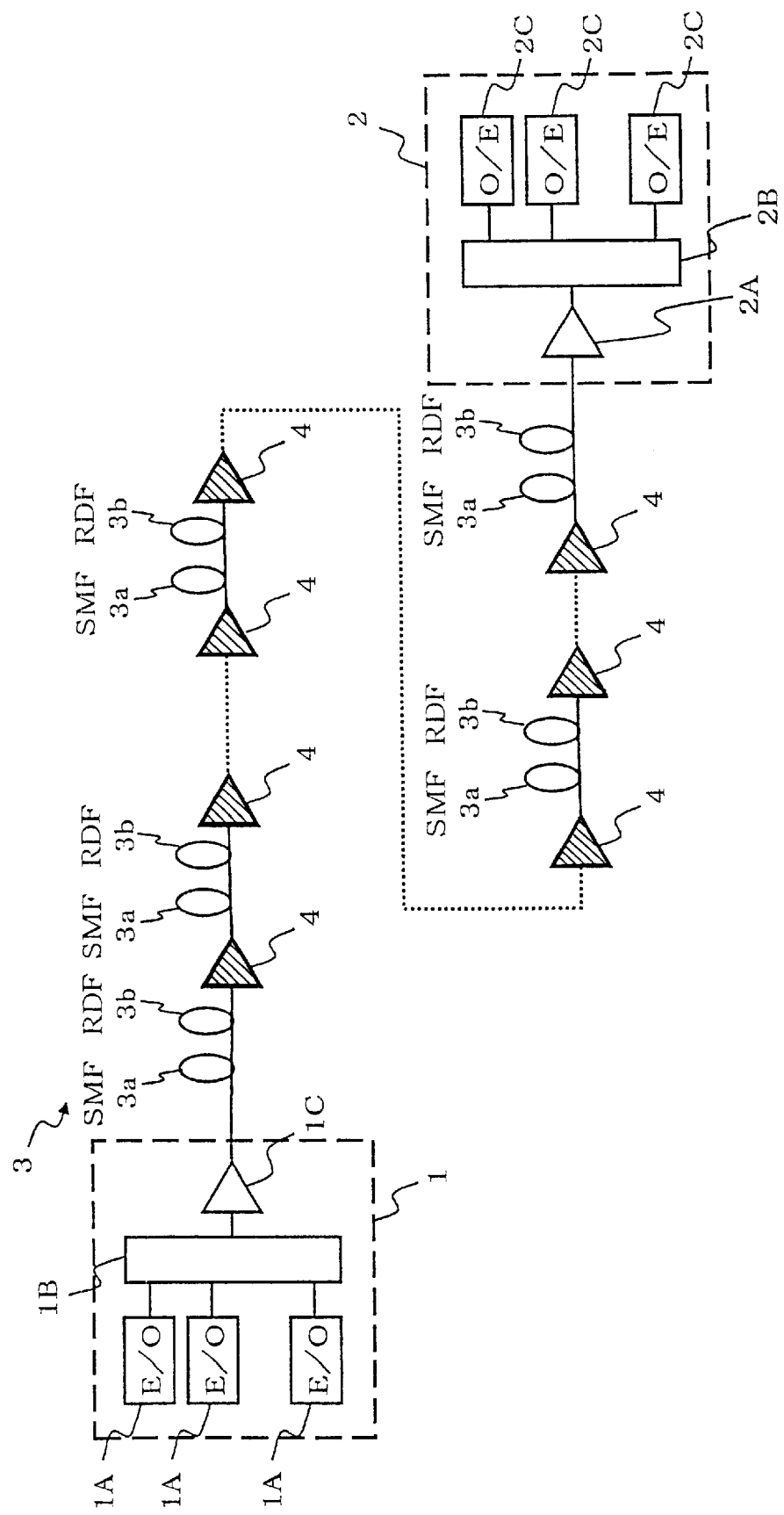
FIG. 1 is a block diagram showing a system constitution of a first embodiment according to the present invention.

FIG. 1 is a block diagram showing a whole constitution of a WDM optical transmission system in a first embodiment according to the present invention.

The WDM optical transmission system in FIG. 1 is constituted such as of an optical sending station (OS) 1, an optical receiving station (OR) 2, an optical transmission path 3 connecting the sending and receiving stations, and a plurality of optical amplifiers 4 arranged on the way of the optical transmission path 3 at predetermined intervals.

The optical sending station 1 includes: a plurality of optical transmitters (E/O) 1A for outputting, respectively, a plurality of optical signals having wavelengths different from one anther; a multiplexer 1B for wavelength multiplexing the plurality of optical signals; and a post amplifier 1C for amplifying WDM signal light from the multiplexer 1 B up to a predetermined level to output it to the optical transmission path 3.

It is herein supposed that WDM signal light including two wavelength bands such as 1550 nm band and 1580 nm band are transmitted through the optical transmission path 3. Note, 1550 nm band is a wavelength band which is so-called "C band" such as ranging from 1545 nm to 1560 nm. Further, 1580 nm band is a wavelength band which is so-called "L band" such as ranging from 1575 nm to 1600 nm.

The optical receiving station 2 includes: a preamplifier 2A for amplifying WDM signal lights of respective wavelength bands transmitted via the optical transmission path 3 up to a required level; a demultiplexer 2B for demultiplexing the light output from the preamplifier 2A, into a plurality of optical signals corresponding to wavelengths; and a plurality of optical receivers (O/E) 2C which receive to process the plurality of optical signals, respectively.

The optical transmission path 3 includes a plurality of repeating sections for interconnecting the optical sending station 1, respective optical amplifiers 4 and the optical receiving station 2. For each of the wavelength bands of WDM signal light, applied to each of the repeating sections is a hybrid transmission path established by adopting: a 1.3 µm zero-dispersion SMF 3a having a positive wavelength dispersion value and a positive dispersion slope, for a former part (transmitting side); and a reversed dispersion fiber 3b (hereinafter abbreviated to "RDF") having a negative wavelength dispersion value and a negative dispersion slope, for a latter part (receiving side).

Thus, the 1.3 µm zero-dispersion SMF 3a corresponds to a first optical fiber and the reversed dispersion fiber 3b corresponds to a second optical fiber, and the repeating section adopting the hybrid transmission path corresponds to a first transmission section, herein.

There will be concretely described hereinafter wavelength dispersion characteristics of the above described hybrid transmission path.

Figure 2:
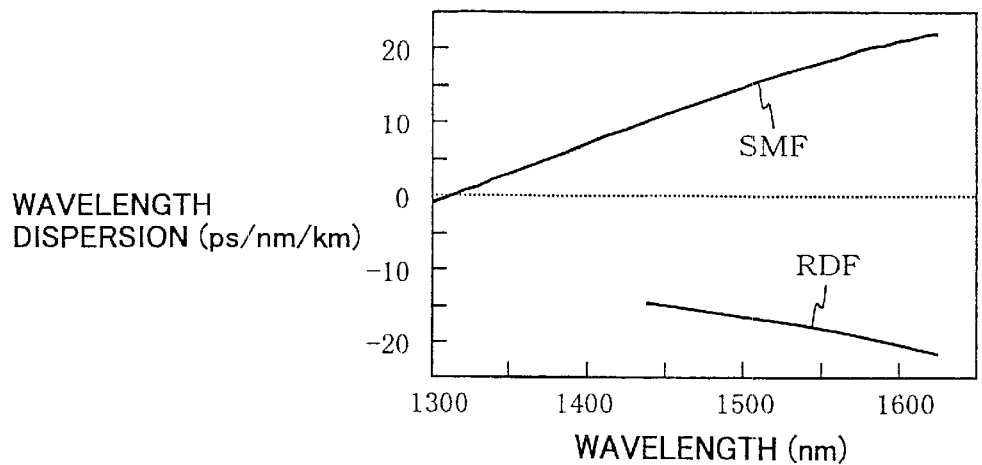
FIG. 2 is a graph showing an example of general wavelength dispersion characteristics of a 1.3 µm zero-dispersion SMF and an RDF, in the first embodiment.

FIG. 2 is a graph showing an example of general wavelength dispersion characteristics of the 1.3 µm zero-dispersion SMF 3a and the RDF 3b.

As shown in FIG. 2, the 1.3 µm zero-dispersion SMF 3a has a wavelength dispersion which becomes zero near 1.3 µm, and a positive dispersion slope in which the wavelength dispersion becomes larger as the wavelength becomes longer. Further, an absolute value of the dispersion slope becomes small as the wavelength becomes longer. Meanwhile, the RDF 3b is designed to have a negative wavelength dispersion for wavelength band of signal light, conflicting with the 1.3 µm zero-dispersion SMF 3a, and to have a negative dispersion slope in which the wavelength dispersion becomes small as the wavelength becomes longer. In addition, an absolute value of the dispersion slope becomes larger as the wavelength becomes longer. Thus, both of the 1.3 µm zero-dispersion SMF 3a and the RDF 3b have wavelength dispersion characteristics convexed upwardly in this figure. As such, in case that a broadband WDM signal light including a plurality of wavelength bands is transmitted, it becomes difficult for the RDF 3b to compensate wavelength dispersions and dispersion slopes caused within the 1.3 µm zero-dispersion SMF 3a for all the wavelength bands.

Then, in this embodiment, there is applied such a constitution: that the wavelength dispersion characteristic of the RDF 3b is set to compensate the wavelength dispersion and dispersion slope caused within the 1.3 µm zero-dispersion SMF 3a up to approximately 100% while setting, for example, the 1580 nm band as a reference wavelength band (i.e., target wavelength band); and that only a compensation error of wavelength dispersion caused in the 1550 nm band is compensated by the optical amplifier 4 at the latter stage.

Figure 3:
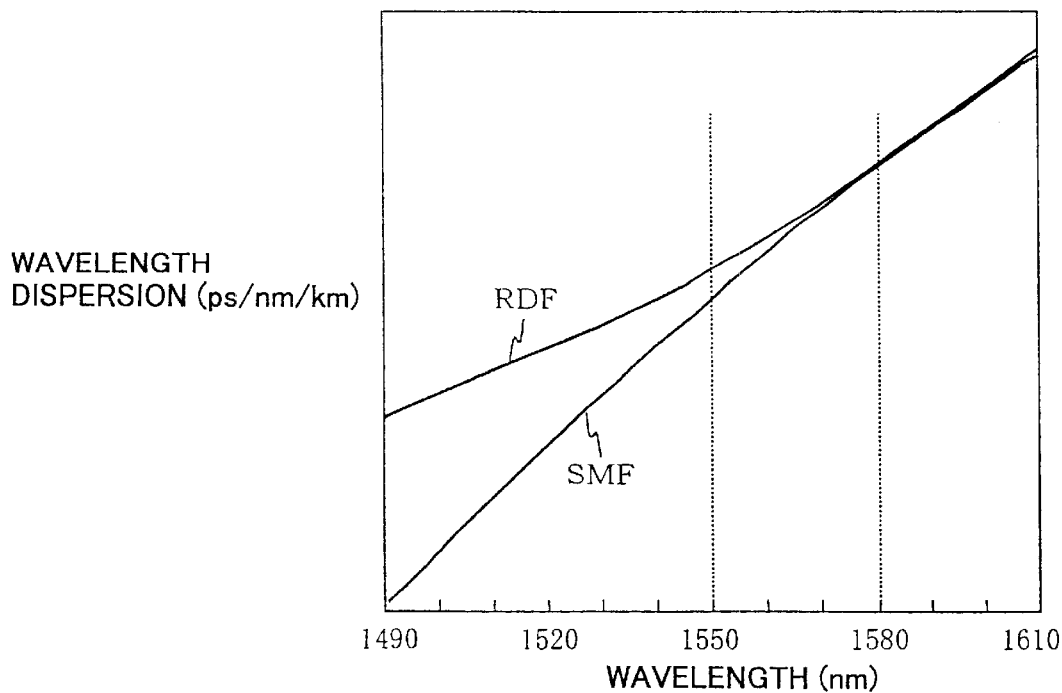
FIG. 3 is a graph showing wavelength dispersion characteristics of a hybrid transmission path to be used in the first embodiment.

FIG. 3 shows wavelength dispersion characteristics of a hybrid transmission path, when the wavelength dispersion characteristic of the RDF 3b is set, based on 1580 nm. It should be particularly noted that the wavelength dispersion characteristic of the RDF is represented by an absolute value, and the same rule applies hereinbelow.

As shown in FIG. 3, the wavelength dispersion and dispersion slope are compensated up to nearly 100% at the 1580 nm band, while the wavelength dispersion compensation by the RDF 3b is excessive at the 1550 nm band, so that a negative wavelength dispersion is accumulated. As to the dispersion slope at 1550 nm band, the compensation by the RDF 3b is insufficient, so that a positive dispersion slope will remain.

Note, as representative values of wavelength dispersion characteristics of the 1.3 µm zero-dispersion SMF 3a at 1580 nm as a setting basis of the hybrid transmission path, there can be mentioned a wavelength dispersion of 19.94 ps/nm/km and a dispersion slope of 0.052 ps/nm²/km, for example. In this case, the wavelength dispersion characteristics of the RDF 3b are set such that, at 1580 nm, its wavelength dispersion approaches −19.94 ps/nm/km and the dispersion slope approaches −0.052 ps/nm²/km as close as possible.

Only, in case of a system constitution where hybrid transmission paths are adopted in a plurality of repeating sections like this embodiment, it is necessary to set wavelength dispersion characteristics of respective optical fibers in the repeating section at the second stage and so forth, also taking into consideration the wavelength dispersion remaining in a former stage (the residual wavelength dispersion corresponds to an error portion relative to 100% compensation ratio).

Further, for other setting conditions (such as length of the 1.3 μm zero-dispersion SMF 3a and/or RDF 3b) of the hybrid transmission path including optical fibers the wavelength dispersion characteristics of which are duly set as mentioned above, it is preferable to set them in a manner identically with conditions described in Japanese Patent Application No. 11-58499 which is a prior application of the present applicant. Outline of the invention of the prior application is to apply a setting condition such that the length ratio of the RDF 3b of the hybrid transmission path used in a repeating section is set such as to be between 20% and 40% of the repeating section, so as to reduce such as affection of non-linear effect and transmission loss in the hybrid transmission path, to thereby improve the transmission characteristics; but the detailed explanation of such an invention shall be omitted herein.

Each of the optical amplifiers 4 has a basic constitution adapted to demultiplex the WDM signal light transmitted via the optical transmission path 3 for each of wavelength bands, to amplify the demultiplexed signal light, and then to multiplex it again and output it. In this basic constitution, inserted into a propagation path of 1550 nm band is a dispersion compensation device for compensating the residual wavelength dispersion and dispersion slope of 1550 nm band which have not been compensated in the aforementioned hybrid transmission path.

Figure 4:
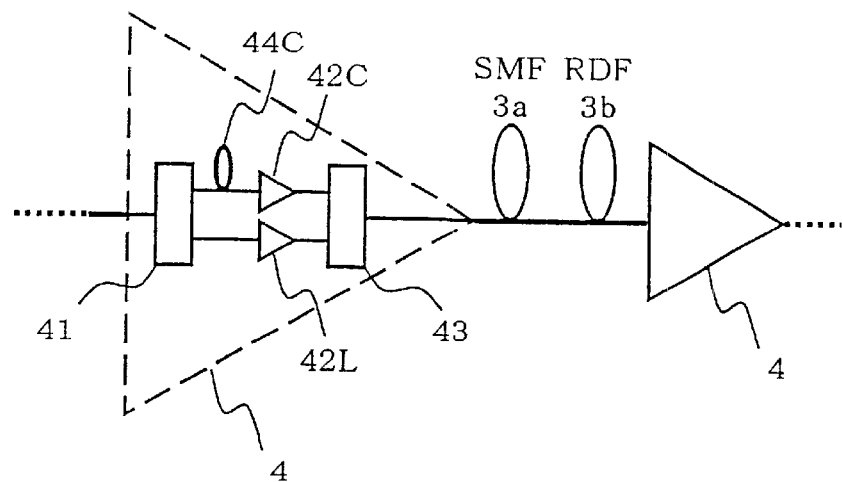
FIG. 4 is a diagram showing a specific constitutional example of an optical amplifier to be used in the first embodiment.

FIG. 4 is a diagram showing a specific constitutional example of the optical amplifier 4.

The optical amplifier 4 shown in FIG. 4 includes, as the aforementioned basic constitution: a demultiplexer 41 for demultiplexing the WDM signal light input from the optical transmission path 3, into the 1550 nm band and 1580 nm band; a 1550-nm-band optical amplifying part 42C for amplifying the WDM signal light at the demultiplexed 1550 nm band, up to a predetermined level; a 1580-nm-band optical amplifying part 42L for amplifying the WDM signal light at the demultiplexed 1580 nm band, up to a predetermined level; and a multiplexer 43 for multiplexing the WDM signal lights output from the optical amplifying parts 42C, 42L at the respective wavelength bands. Further, as a dispersion compensation part for compensating the residual wavelength dispersion in the hybrid transmission path, such as dispersion compensation fiber 44C is inserted between a 1550-nm-band output port of the demultiplexer 41 and an input port of the 1550-nm-band optical amplifying part 42C.

The dispersion compensation fiber 44C has a positive wavelength dispersion corresponding to a compensation error (negative wavelength dispersion relative to 1550 nm band) caused within the hybrid transmission path of a former stage. Concretely, as the fiber 44C, it is possible to use an optical fiber similar to the 1.3 μm zero-dispersion SMF 3a used in the former part of the hybrid transmission path.

Here, the reason why a 1.3 μm zero-dispersion SMF can be incorporated in an optical amplifier as the dispersion compensation fiber 44C for 1550 nm band, is that: most of the wavelength dispersions caused at 1550 nm band have been compensated by the hybrid transmission path, so that it is enough to compensate a positive wavelength dispersion corresponding to an error portion by an optical amplifier, thereby allowing usage of such a relatively short SMF which can be readily mounted within the optical amplifier.

Figure 5:
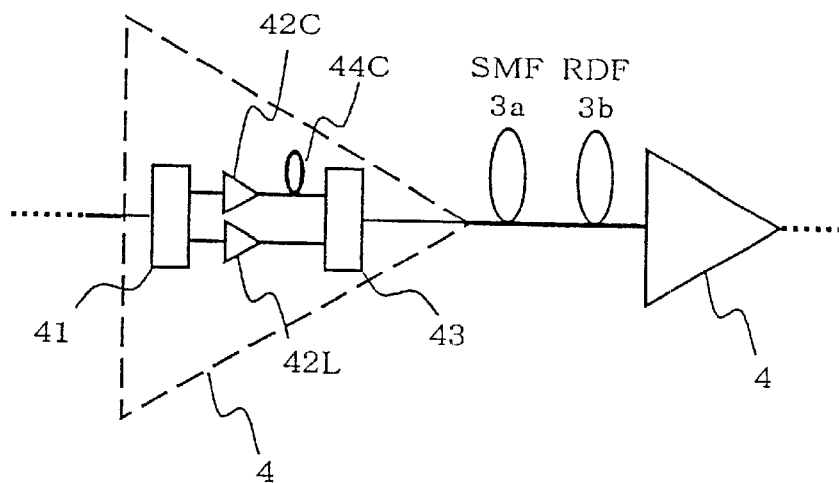
FIG. 5 is a diagram showing another specific constitutional example relating to the optical amplifier of FIG. 4.

The dispersion compensation fiber 44C is provided at an input side of the 1550-nm-band optical amplifying part 42C in this embodiment. However, it is possible to insert the dispersion compensation fiber 44C between an output port of the 1550-nm-band optical amplifying part 42C and a 1550-nm-band input port of the multiplexer 43, as shown in FIG. 5.

As the 1550-nm-band optical amplifying part 42C, it is possible to adopt a known optical amplifier such as an erbium doped optical fiber amplifier (EDFA) having its amplification band at 1550 nm band. Further, as the 1580-nm-band optical amplifying part 42L, it is possible to adopt a known optical amplifier which is to have optical amplification effect at 1580 nm band such as by lengthening an erbium doped optical fiber (EDF) for a 1550-nm-band EDFA.

There will be described hereinafter an operation of the first embodiment.

In the WDM optical transmission system having the above described. constitution, the respective optical signals at 1550 nm band and 1580 nm band generated at respective optical transmitters 1A of the optical sending station 1 are wavelength multiplexed by the multiplexer 1B, then amplified by the post amplifier 1C, and thereafter transmitted onto a first stage hybrid transmission path of the optical transmission path 3.

In the hybrid transmission path, the WDM signal light of the respective wavelength bands is propagated through the 1.3 μm zero-dispersion SMF 3a at the former part to thereby cause a positive wavelength dispersion, and propagated through the RDF 3b at the latter part to thereby cause a negative wavelength dispersion. At this time, as shown in the aforementioned FIG. 3, the wavelength dispersion and dispersion slope caused in the 1.3 μm zero-dispersion SMF 3a concerning the WDM signal light at 1580 nm band are compensated up to approximately 100% by the RDF 3b. However, the wavelength dispersion compensation by the RDF 3b is excessive for the WDM signal light at the 1550 nm band, so that a negative wavelength dispersion will remain. Further, for the dispersion slope at 1550 nm band, compensation by the RDF 3b is insufficient so that a positive dispersion slope will remain.

Then, the WDM signal light passed through the hybrid transmission path of the first stage is input into the optical amplifier 4, and demultiplexed into WDM signal light at 1550 nm band and WDM signal light at 1580 nm band by means of the demultiplexer 41. The WDM signal light at 1550 nm band is sent to the dispersion compensation fiber 44C where a positive wavelength dispersion is caused to thereby compensate the residual wavelength dispersion caused within the hybrid transmission path, and then the WDM signal light is sent to the 1550-nm-band optical amplifying part 42C. Meanwhile, the WDM signal light at 1580 nm band is sent as it is, to the 1580-nm-band optical amplifying part 42L. Note, the residual dispersion slope caused within the hybrid transmission path is not compensated by the dispersion compensation fiber 44C, in this embodiment.

Those WDM signal lights of the respective wavelength bands sent to the optical amplifying parts 42C, 42L are amplified up to required levels by these parts, then sent to the multiplexer 43 to thereby be multiplexed again, and thereafter output onto a hybrid transmission path of a next stage. Thereafter, operation identical with the above is repeated in each of repeating sections so that the WDM signal lights of respective wavelength bands are transmitted in a relayed manner up to the optical receiving station 2.

The WDM signal lights arrived at the optical receiving station 2 are amplified up to required levels by the preamplifier 2A, demultiplexed into a plurality of optical signals corresponding to respective wavelengths by the demultiplexer 2B, and then received and processed by the corresponding optical receivers 2C, respectively.

According to the first embodiment as described above, the wavelength dispersion characteristics of respective optical fibers are set such that the wavelength dispersion and dispersion slope at 1580 nm band within each of the hybrid transmission paths are compensated up to approximately 100%, and the optical amplifiers 4 are provided therein with only the dispersion compensation fibers 44C for 1550 nm band, respectively. Thus, there are assuredly compensated the wavelength dispersion and dispersion slope at 1580 nm band and the wavelength dispersion at 1550 nm band making use of simple constitutions, thereby enabling cost reduction of optical amplifiers constituting the WDM optical transmission system.

Further, as the dispersion compensation fiber to be provided within the optical amplifier, there can be adopted a 1.3 μm zero-dispersion SMF having a positive wavelength dispersion and a large mode field diameter. Thus, it becomes possible to realize a system rarely affected by non-linear effect, as compared to a conventional situation where there is used a dispersion compensation fiber having a negative wavelength dispersion and a small mode field diameter.

In the above described first embodiment, the wavelength dispersion and dispersion slope at 1580 nm band are compensated up to approximately 100% within the hybrid transmission paths, but the present invention is not limited thereto. Generally, it is preferable that the accumulated wavelength dispersion caused in transmitted light has a negative value. This is to avoid such a situation that, when an accumulated wavelength dispersion has a positive value, a peak power of light becomes large by compression effect of an optical pulse, resulting in that the transmitted light is susceptible to non-linear effect.

Figure 6:
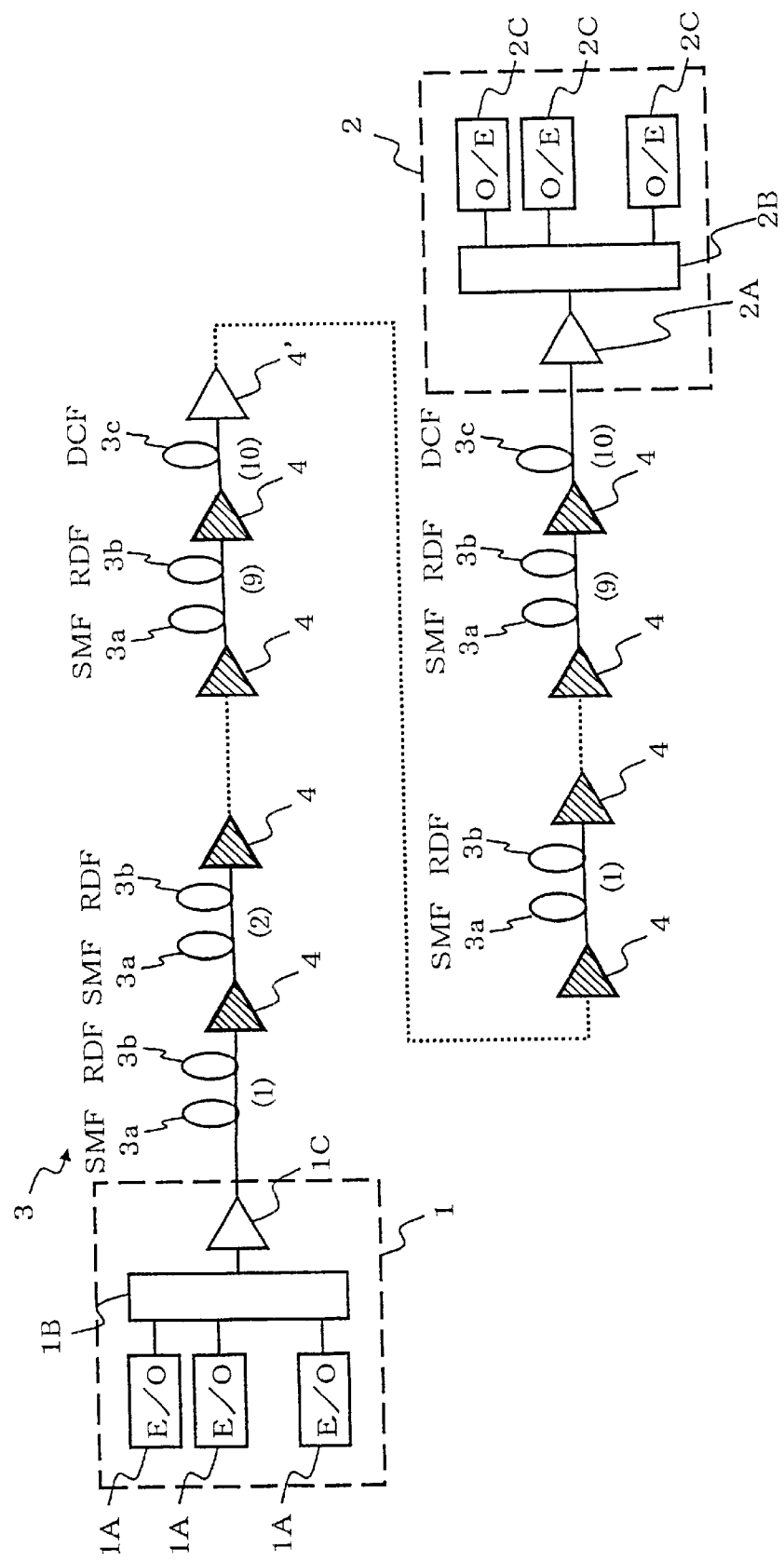
FIG. 6 is a diagram showing another specific system constitutional example relating to the system constitution of FIG. 1.

Accordingly, it is also possible that the accumulated wavelength dispersion caused within a whole of the hybrid transmission path is rendered to have a negative value, by setting such that: for the hybrid transmission path, the sum of the accumulated wavelength dispersion at the 1.3 μm zero-dispersion SMF 3a and that at the RDF 3b becomes negative; namely, the wavelength dispersion compensation by the RDF 3b for the 1.3 μm zero-dispersion SMF 3a becomes slightly excessive even at the 1580 nm band. In this case, negative wavelength dispersions are accumulated for wavelength bands of both of 1550 nm band and 1580 nm band whenever the signal light passes through the hybrid transmission path, so that it is desirable that the accumulated negative wavelength dispersions are to be collectively compensated such as at intervals of every 10 repeating sections. FIG. 6 shows a system constitutional example for such a situation.

In the constitutional example of FIG. 6, the accumulated wavelength dispersions caused within the hybrid transmission paths from 1st through 9th repeating sections are compensated by a transmission path at a 10th repeating section, and thereafter the accumulated wavelength dispersions are compensated in the same manner at intervals of every 10 repeating sections. As the transmission path to be used for a repeating section (second transmission section) for compensating the accumulated wavelength dispersions, there is applied a dispersion compensation fiber 3c (third optical fiber) having a wavelength dispersion conflicting with the accumulated negative wavelength dispersions caused within the preceding 9 repeating sections. It is possible to use such as a 1.3 μm zero-dispersion SMF for the dispersion compensation fiber 3c, and an output end thereof is connected to a normal optical amplifier 4' having no dispersion compensaiton fibers for propagation paths of both wavelength bands.

In the constitutional example of FIG. 6, there is adopted the dispersion compensation fiber 3c at intervals of every 10 repeating sections, but the compensating interval for accumulated wavelength dispersions is not limited thereto. Only, it is effective that the compensating interval for accumulated wavelength dispersions has a longer distance, since, when the compensating interval for the accumulated wavelength dispersions is short, the accumulated wavelength dispersions are frequently brought back to zero so that non-linear effect may become large. Concretely, it is considered to be desirable that the compensating interval is 10 times longer than the repeating section.

There will be now described a WDM optical transmission system according to a second embodiment of the present invention.

In this second embodiment, there is considered such a situation that the wavelength dispersion characteristics of the hybrid transmission path are set by regarding the 1550 nm band as a reference wavelength band.

Figure 7:
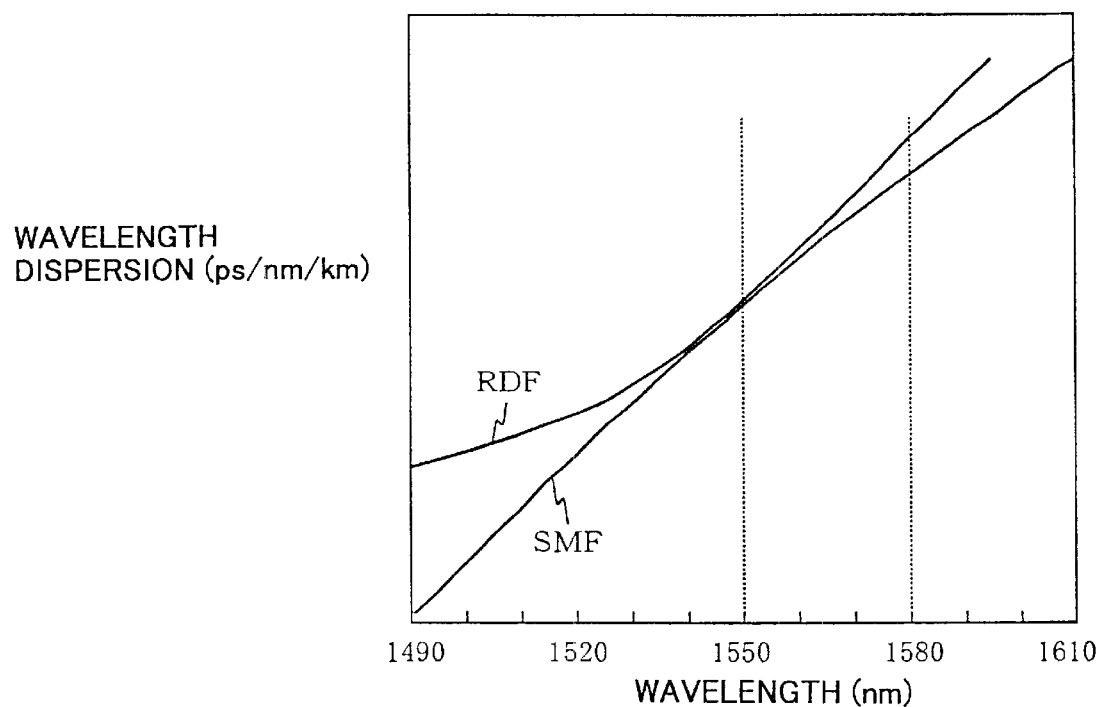
FIG. 7 is a graph showing wavelength dispersion characteristics of a hybrid transmission path to be used in a second embodiment according to the present invention.

FIG. 7 is a graph showing wavelength dispersion characteristics of a hybrid transmission path to be used in the second embodiment, i.e., of a hybrid transmission path set with wavelength dispersion characteristics of the RDF 3b based on 1550 nm band.

As shown in FIG. 7, the wavelength dispersion and dispersion slope of the 1.3 μm zero-dispersion SMF 3a are compensated up to approximately 100% at 1550 nm band within the hybrid transmission path to be used in this embodiment, whereas the compensation by the RDF 3b for wavelength dispersion and dispersion slope at 1580 nm band is excessive so that negative wavelength dispersion and negative dispersion slope are accumulated.

Representative values of the wavelength dispersion characteristics of the 1.3 μm zero-dispersion SMF 3a at 1550 nm which is a setting basis of the hybrid transmission path, may include a wavelength dispersion of 18.18 ps/nm/km and a dispersion slope of 0.063 ps/nm$^2$/km. In this case, the wavelength dispersion characteristics of the RDF 3b are set such that, at 1550 nm, its wavelength dispersion approaches −18.18 ps/nm/km and the dispersion slope approaches −0.063 ps/nm$^2$/km as close as possible.

Figure 8:
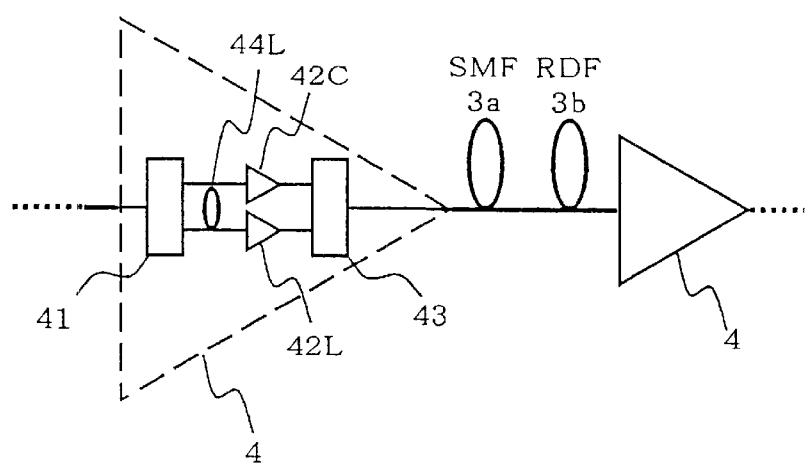
FIG. 8 is a diagram showing a specific constitutional example of an optical amplifier to be used in the second embodiment.
Figure 9:
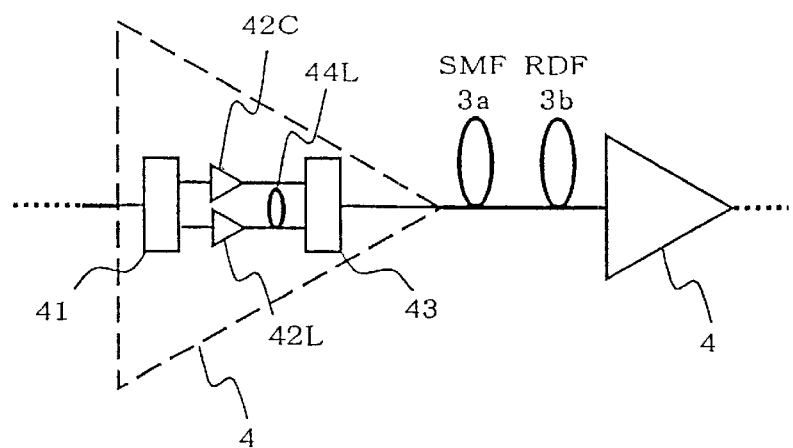
FIG. 9 is a diagram showing another specific constitutional example relating to the optical amplifier of FIG. 8.

FIG. 8 is a block diagram showing a specific constitutional example of an optical amplifier 4 to be used in the second embodiment.

As shown in FIG. 8, the constitution of this optical amplifier 4 is different from that in the first embodiment, in that there is inserted a dispersion compensation fiber 44L into a propagation path of 1580 nm band, instead of the dispersion compensation fiber 44C of the first embodiment which was inserted into a propagation path of 1550 nm band. Constitutions of the optical amplifier 4 other than the above are identical with those of the first embodiment.

In this embodiment, the dispersion compensation fiber 44L is inserted between a 1580-nm-band output port of the demultiplexer 41 and an input port of the 1580-nm-band optical amplifying part 42L. This dispersion compensation fiber 44L may have a positive wavelength dispersion and a positive dispersion slope corresponding to the compensation errors (negative wavelength dispersion and negative dispersion slope relative to 1580 nm band) caused within a hybrid transmission path of a former stage, and may be constituted of an optical fiber identical with the 1.3 μm zero-dispersion SMF 3a to be used in the former part of the hybrid transmission path.

Note, the dispersion compensation fiber 44L is provided at an input side of the 1580-nm-band optical amplifying part 42L, but it is possible to insert the dispersion compensation fiber 44L between an output port of the 1580-nm-band optical amplifying part 42L and a 1580-nm-band input port of the multiplexer 43.

Within each of the hybrid transmission paths of the second embodiment as described above, the wavelength dispersion and dispersion slope caused within the 1.3 μm zero-dispersion SMF 3a for the WDM signal light at 1550 nm band are compensated up to approximately 100%, by the RDF 3b but the compensation by the RDF 3b for the WDM signal light at 1580 nm band becomes excessive so that a negative wavelength dispersion and a negative dispersion slope will remain. Nonetheless, these residual wavelength dispersion and dispersion slope at 1580 nm band are compensated by the dispersion compensation fiber 44L inserted in the 1580-nm-band propagation path within the optical amplifier 4, so that wavelength dispersion compensations are assuredly conducted for both wavelength bands of 1550 nm band and 1580 nm band.

According to the second embodiment as described above, the wavelength dispersion characteristics of the respective optical fibers are set such that the wavelength dispersion and dispersion slope at 1550 nm band are compensated up to approximately 100% within hybrid transmission paths, respectively, and there are provided only reversed dispersion fibers for 1580 nm band within optical amplifiers, respectively. As a result, it becomes possible to conduct compensation of wavelength dispersions and dispersion slopes at both wavelength bands of 1550 nm band and 1580 nm band, more assuredly with a simple constitution. Thus, it becomes possible to realize a WDM optical transmission system having more assured dispersion compensation, at a reduced cost.

In each of the above first and second embodiments, although the compensation ratio at reference wavelength band in the hybrid transmission path is set to be maximum (approximately 100%) for both of wavelength dispersion and dispersion slope, it is possible to set such that the compensation ratio of wavelength dispersion only becomes maximum. In this case, since a compensation ratio of dispersion slope in a hybrid transmission path becomes small, so that transmission characteristics are degraded as compared to the first and second embodiments. Nonetheless, this may be sufficiently effective, depending on a specification of a system.

Figure 10:
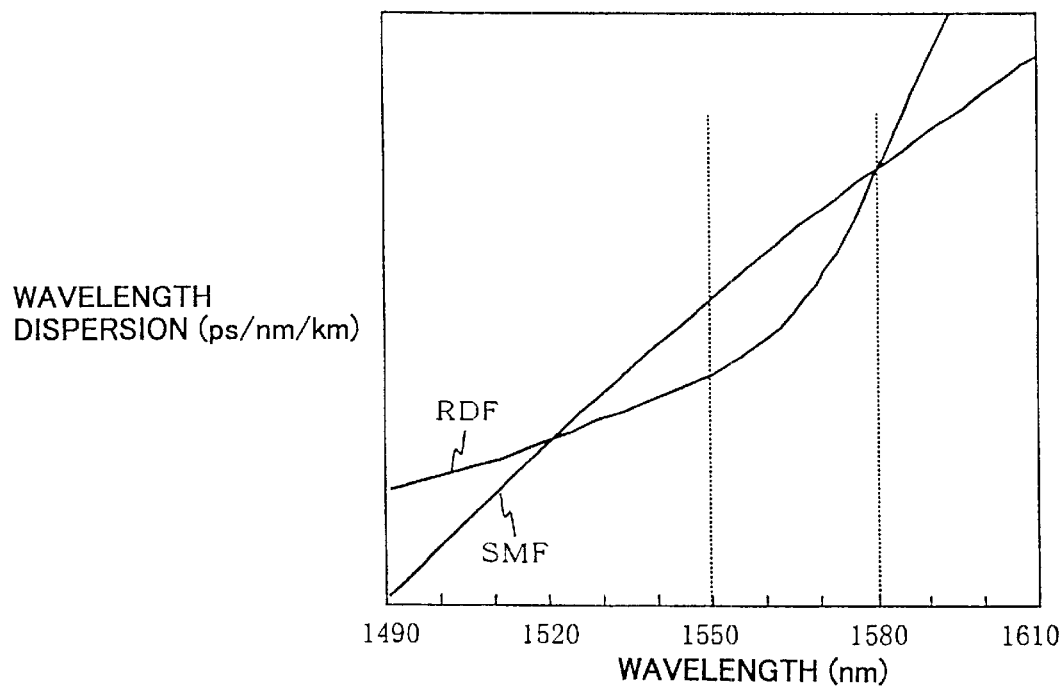
FIG. 10 is a graph showing wavelength dispersion characteristics of a hybrid transmission path when a wavelength dispersion at a 1580 nm band is set to be maximumly compensated, for the first and second embodiments.

Concretely, as shown in FIG. 10, when the wavelength dispersions of the RDF 3b are set such that the wavelength dispersion of the 1.3 μm zero-dispersion SMF 3a is compensated up to approximately 100% at 1580 nm band, there will remain a positive wavelength dispersion at 1550 nm band. Then, it is possible to reduce the residual wavelength dispersion caused within the hybrid transmission path, by inserting a dispersion compensation fiber (such as an optical fiber identical with the RDF 3b) having a negative wavelength dispersion, into a 1550-nm-band propagation path within an optical amplifier.

Figure 11:
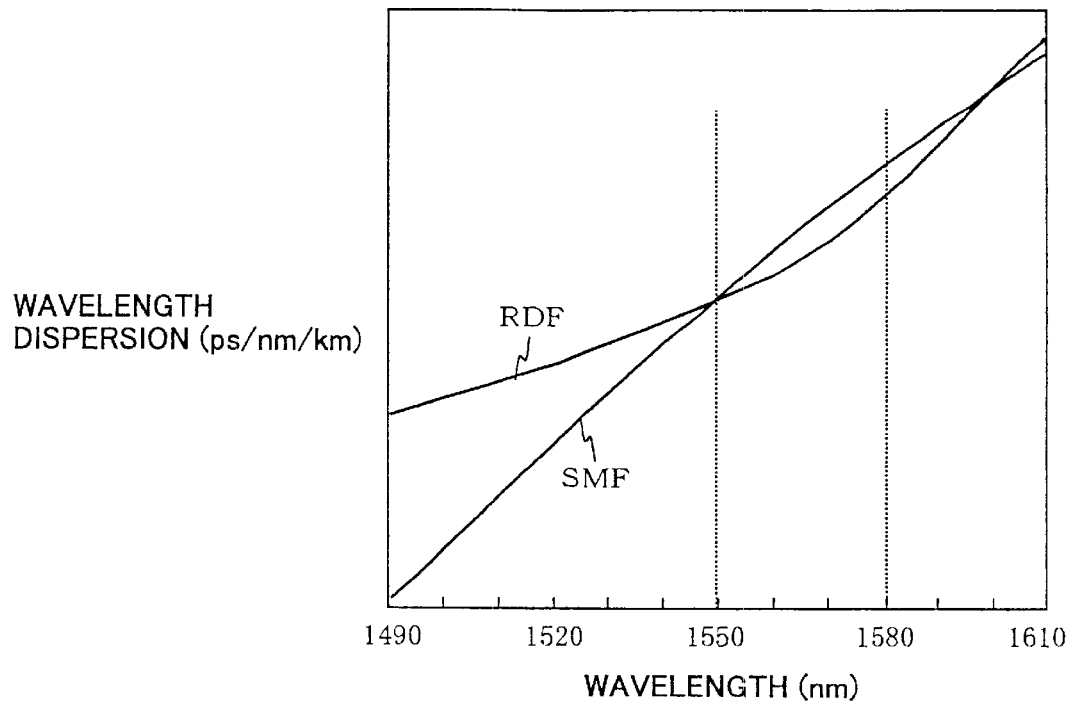
FIG. 11 is a graph showing wavelength dispersion characteristics of a hybrid transmission path when a wavelength dispersion at a 1550 nm band is set to be maximumly compensated, for the first and second embodiments.

Further, as shown in FIG. 11, also when the wavelength dispersions of the RDF 3b are set such that the wavelength dispersion of the 1.3 μm zero-dispersion SMF 3a is compensated up to approximately 100% at 1550 nm band, there will remain a positive wavelength dispersion at 1580 nm band. Then, it is possible to reduce the residual wavelength dispersion caused within the hybrid transmission path, by inserting a dispersion compensation fiber (such as an optical fiber identical with the RDF 3b) having a negative wavelength dispersion, into a 1580-nm-band propagation path within an optical amplifier.

There will be described a WDM optical transmission system according to a third embodiment of the present invention.

In this third embodiment, there will be described such a situation that a wavelength dispersion compensation at an optical amplifier is eliminated by setting the wavelength dispersion characteristics of the RDF 3b such that: the wavelength dispersions of two wavelength bands at 1550 nm band and 1580 nm band are compensated up to approximately 100%, respectively, within a hybrid transmission path in a WDM optical transmission system in which WDM signal lights at both wavelength bands are transmitted.

Figure 12:
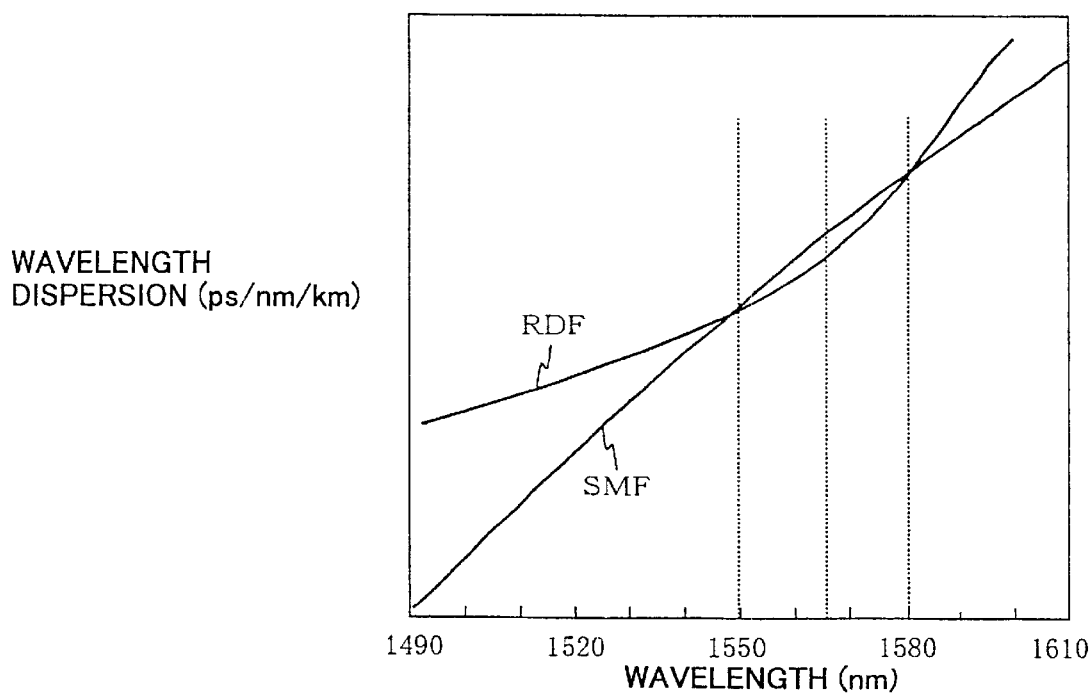
FIG. 12 is a graph showing wavelength dispersion characteristics of a hybrid transmission path to be used in a third embodiment according to the present invention.

FIG. 12 is a graph showing wavelength dispersion characteristics of a hybrid transmission path to be used in the third embodiment.

As shown in FIG. 12, the wavelength dispersion characteristics of the RDF 3b are set such that the wavelength dispersions of 1.3 μm zero-dispersion SMF 3a are compensated at the central wavelengths of 1550 nm band and 1580 nm band up to approximately 100%, respectively. At this time, for the dispersion slopes, there will be realized approximately 100% of compensation near a wavelength (approximately 1565 nm) intermediate between 1550 nm band and 1580 nm band, but slight compensation errors will occur at 1550 nm band and 1580 nm band, respectively. Nonetheless, the compensation errors of dispersion slopes can be regarded as being such an extent that they will noway affect the transmission characteristics, when considering the band widths (in the order of approximately 30 nm) of the respective wavelength bands.

Figure 13:
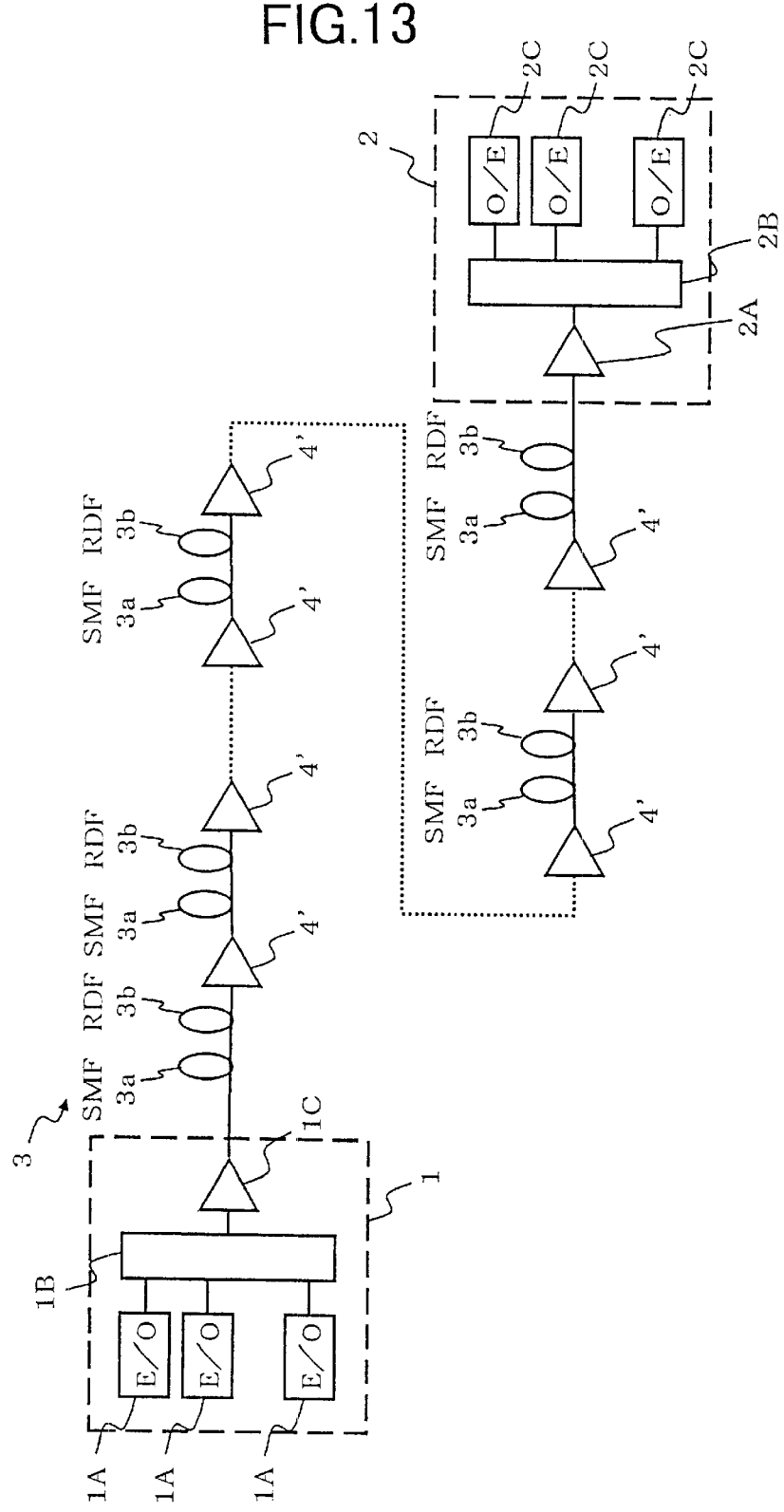
FIG. 13 is a block diagram showing a system constitution of the third embodiment.

FIG. 13 is a block diagram showing a whole constitution of the WDM optical transmission system in the third embodiment.

In FIG. 13, the system constitution in case of adopting hybrid transmission paths as set above is different from those constitutions of the above described first and second embodiments, in that optical amplifiers 4' having no dispersion compensaiton fibers in propagation paths of any wavelength bands are arranged for each of repeating sections, instead of the optical amplifiers 4 including a dispersion compensaiton fiber provided in the propagation path of one of the wavelength bands. Constitutions of the present system other than the above are identical with those of the first and second embodiments.

In the WDM optical transmission system having the above described constitution, the wavelength dispersions at 1550 nm band and 1580 nm band caused within 1.3 μm zero-dispersion SMF 3a are compensated by the RDF 3b up to levels having no affections to transmission characteristics, respectively, within each of the hybrid transmission paths in the respective repeating sections.

In this way, according to the third embodiment, there can be obtained excellent transmission characteristics for a broadband WDM signal light even when dispersion compensations for respective wavelength bands are not particularly performed in each of optical amplifiers, so that it becomes possible to further simplify the optical amplifiers constituting the system according to the present invention with reduced cost.

In the above third embodiment, the compensation errors of dispersion slopes at the respective wavelength bands have been treated as being in such an extent that the same have no affections on the transmission characteristics. However, in case of a system where such compensation errors are problematic, it is possible to separately provide a device for compensating such errors.

There will be described hereinafter a WDM optical transmission system according to a fourth embodiment of the present invention.

In the fourth embodiment, there is considered such a situation that the present invention is applied to a WDM optical transmission system which transmits WDM signal lights such as at three wavelength bands of 1520 nm band, 1550 nm band and 1580 nm band, and the wavelength dispersion characteristics of hybrid transmission paths are set by treating the 1580 nm band as a reference wavelength band. Note, the whole constitution of the WDM optical transmission system is identical with that of the first embodiment shown in FIG. 1.

Figure 14:
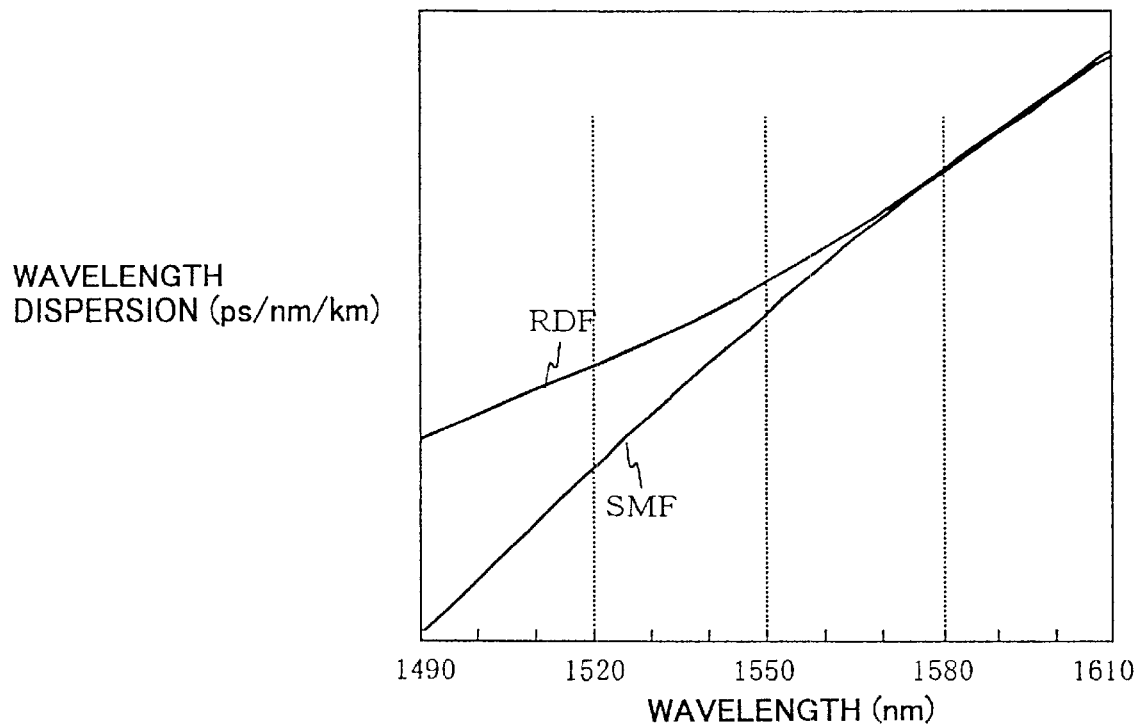
FIG. 14 is a graph showing wavelength dispersion characteristics of a hybrid transmission path to be used in a fourth embodiment according to the present invention.

FIG. 14 is a graph showing wavelength dispersion characteristics of a hybrid transmission path to be adopted in the fourth embodiment.

Similarly to the above described first embodiment, in the hybrid transmission path of this embodiment as shown in FIG. 14, the wavelength dispersion characteristics of the RDF 3b are set such that the wavelength dispersion and dispersion slope caused within the 1.3 μm zero-dispersion SMF 3a can be compensated up to approximately 100%, regarding 1580 nm as a reference. In this way, the wavelength dispersion and dispersion slope are compensated up to approximately 100% at 1580 nm band, while the wavelength dispersion compensation by the RDF 3b becomes excessive at 1550 nm band resulting in accumulation of negative wavelength dispersion, and the wavelength dispersion compensation becomes more excessive at 1520 nm band also resulting in accumulation of negative wavelength dispersion. Further, for the dispersion slopes of 1550 nm band and 1520 nm band, there are accumulated positive dispersion slopes due to lack of compensation by the RDF 3b.

Note, 1520 nm band is a wavelength band which is so-called "S-band" such as ranging from 1500 nm to 1530 nm.

Figure 15:
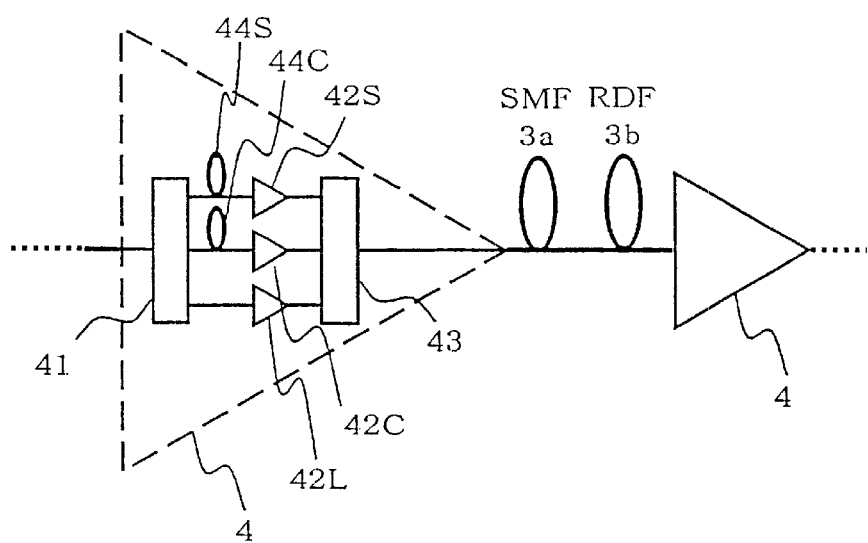
FIG. 15 is a diagram showing a specific constitutional example of an optical amplifier to be used in the fourth embodiment.
Figure 16:
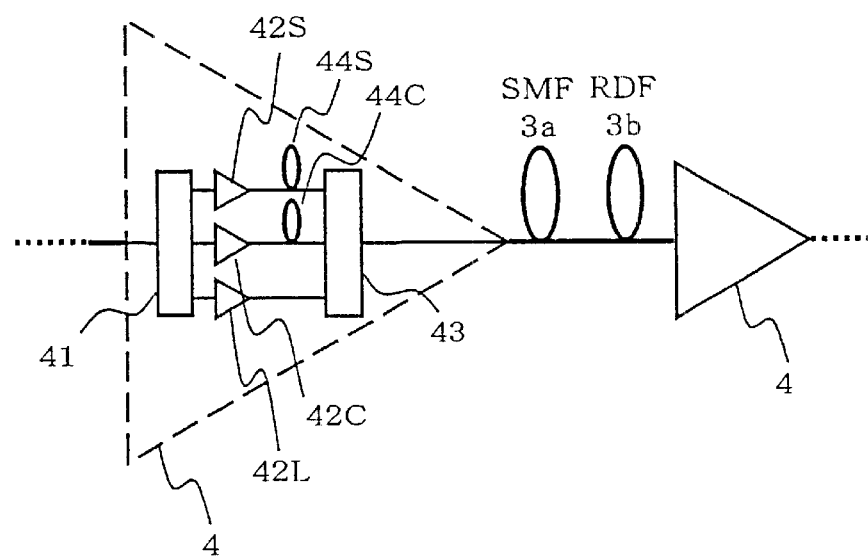
FIG. 16 is a diagram showing another specific constitutional example relating to the optical amplifier of FIG. 15.

FIG. 15 is a block diagram showing a specific constitutional example of respective optical amplifiers 4 applied to the fourth embodiment.

In FIG. 15, the optical amplifier 4 includes: a demultiplexer 41 for demultiplexing WDM signal lights input from an optical transmission path 3 into three wavelength bands of 1520 nm band, 1550 nm band and 1580 nm band; 1520-nm-band optical amplifying part 42S, 1550-nm-band optical amplifying part 42C and 1580-nm-band optical amplifying part 42L for amplifying the demultiplexed WDM signal lights at the respective wavelength bands up to predetermined levels, respectively; a multiplexer 43 for multiplexing the WDM signal lights output from the optical amplifying parts 42S, 42C, 42L; and dispersion compensation fibers 44S and 44C inserted into propagation paths of 1520 nm band and 1550 nm band, respectively.

As the 1520-nm-band optical amplifying part 42S, it is possible to adopt a known optical amplifier having an amplification band such as ranging from 1500 nm to 1530 nm. Concretely, there can be mentioned such as Fiber Raman Amplifier shown in an article "Investigation of a Fiber Raman amplifier for 1520 nm Band WDM transmission, Electronic Information Communication Academy Communication Society Congress, B-10-160, 1998" of Kani et al.

The dispersion compensation fiber 44S is inserted such as between a 1520-nm-band output port of the demultiplexer 41 and an input port of the 1520-nm-band optical amplifying part 42S. This dispersion compensation fiber 44S has a positive wavelength dispersion corresponding to a compensation error (negative wavelength dispersion relative to 1520 nm band) caused within the hybrid transmission path of the former stage. Concretely, it is possible to adopt an optical fiber identical with the 1.3 μm zero-dispersion SMF 3a to be used in the former part of the hybrid transmission path.

The dispersion compensation fiber 44C is inserted such as between a 1550-nm-band output port of the demultiplexer 41 and an input port of the 1550-nm-band optical amplifying part 42C. Similarly to the above described dispersion compensation fiber 44S, also this dispersion compensation fiber 44C has a positive wavelength dispersion corresponding to a compensation error (negative wavelength dispersion relative to 1550 nm band) caused within the hybrid transmission path of the former stage. Concretely, it is possible to adopt such as 1.3 μm zero-dispersion SMF therefor.

Figure 17:
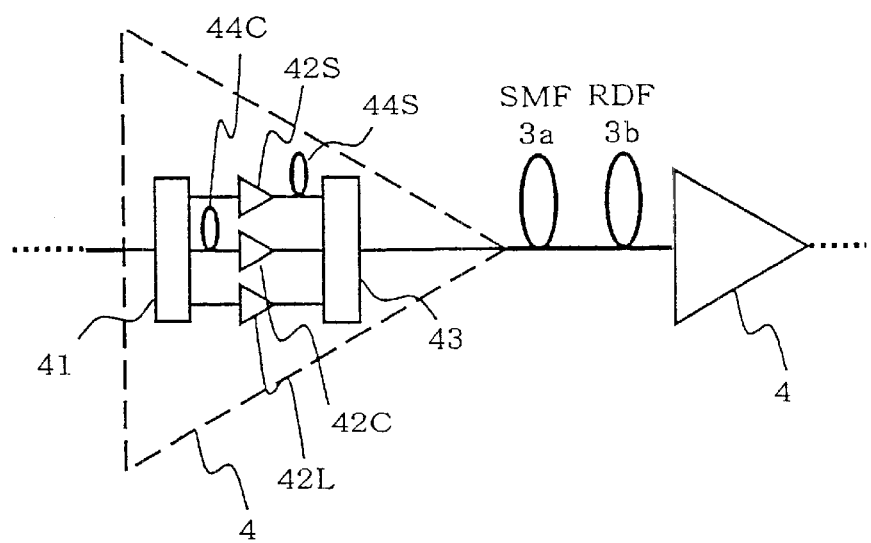
FIG. 17 is a diagram showing yet another specific constitutional example relating to the optical amplifier of FIG. 15.
Figure 18:
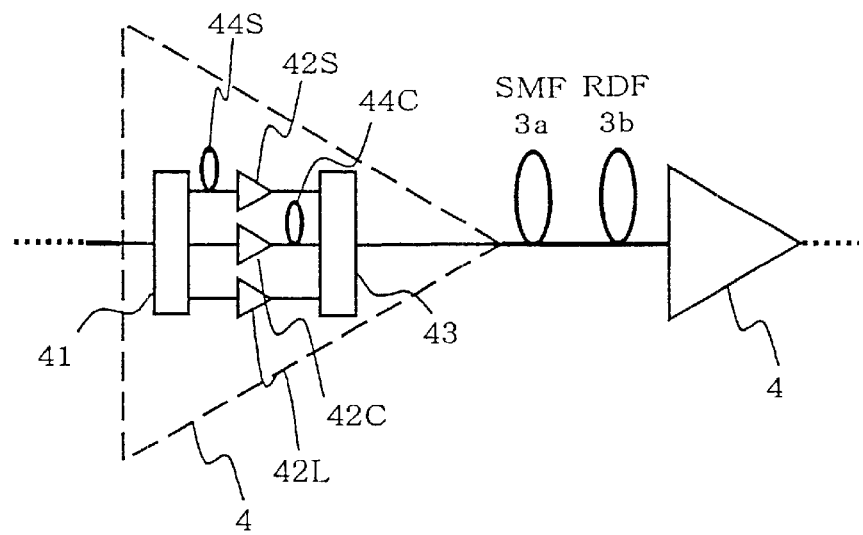
FIG. 18 is a diagram showing a still another specific constitutional example relating to the optical amplifier of FIG. 15.

Here, the dispersion compensation fibers 44S and 44C are provided at the input sides of the optical amplifying parts 42S, 42C, respectively, but the present invention is not limited thereto. For example, the dispersion compensation fibers 44S and 44C may be provided at output sides of the optical amplifying parts 42S, 42C, respectively. Further, as shown in FIG. 17 or FIG. 18, it is possible to provide one of the dispersion compensation fibers at an input side of one of the optical amplifying parts, and the other at an output side of the other optical amplifying part.

In the fourth embodiment as constituted above, for the WDM signal light at 1580 nm band, the wavelength dispersion and dispersion slope caused within the 1.3 μm zero-dispersion SMF 3a are compensated up to approximately 100% by the RDF 3b in each of the hybrid transmission paths. However, for the WDM signal lights at 1520 nm band and 1550 nm band, the compensations by the RDF 3b become excessive so that negative wavelength dispersions will remain. Nonetheless, these residual wavelength dispersions at 1520 nm band and 1550 nm band are compensated by the dispersion compensation fibers 44S and 44C inserted into the propagation paths for 1520 nm band and 1550 nm band within the optical amplifier 4, respectively. Thus, there can be assuredly performed wavelength dispersion compensations for all of the three wavelength bands.

In this way, according to the fourth embodiment, the wavelength dispersion characteristics of optical fibers are set so that wavelength dispersion and dispersion slope at 1580 nm band are compensated up to approximately 100% within the respective hybrid transmission paths, and each of the optical amplifiers is provided with only the 1520-nm-band dispersion compensation fiber 44S and the 1550-nm-band dispersion compensation fiber 44C. Thus, the wavelength dispersion compensations of three wavelength bands of 1520 nm band, 1550 nm band and 1580 nm band can be assuredly performed with a simplified constitution, thereby enabling reduced cost of optical amplifiers constituting the WDM optical transmission system.

There will be described hereinafter a WDM optical transmission system according to fifth embodiment of the present invention.

In this fifth embodiment, similarly to the fourth embodiment, there is considered such a situation that the wavelength dispersion characteristics of hybrid transmission paths are set by treating 1550 nm band as a reference wavelength band, for a WDM optical transmission system through which WDM signal lights at three wavelength bands are transmitted. Note, the whole constitution of the WDM optical transmission system is identical with that of the first embodiment as shown in FIG. 1.

Figure 19:
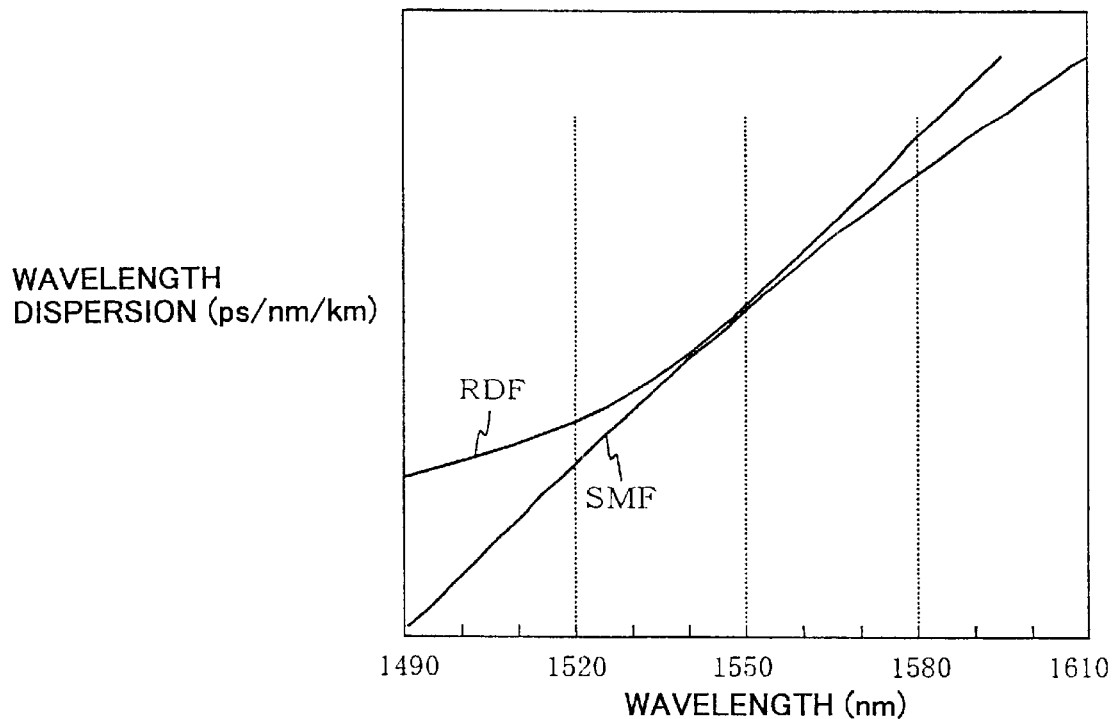
FIG. 19 is a graph showing wavelength dispersions characteristics of a hybrid transmission path to be used in a fifth embodiment according to the present invention.

FIG. 19 is a graph showing wavelength dispersion characteristics of a hybrid transmission path to be used in the fifth embodiment.

Similarly to the second embodiment, in the hybrid transmission path of this embodiment as shown in FIG. 19, the wavelength dispersion characteristics of the RDF 3b are set such that the wavelength dispersion and dispersion slope caused within the 1.3 $\mu$m zero-dispersion SMF 3a can be compensated up to approximately 100%, by treating 1550 nm as reference wavelength. In this way, the wavelength dispersion and dispersion slope are compensated up to approximately 100% for 1550 nm band, whereas negative wavelength dispersions are accumulated at 1520 nm band and 1580 nm band, respectively, since the wavelength dispersions by the RDF 3b are excessive, respectively. Further, as to the dispersion slope at 1520 nm band, positive dispersion slope is accumulated due to lack of compensation by the RDF 3b. As regards the dispersion slope at 1580 nm band, negative dispersion slope is accumulated, since compensation by the RDF 3b becomes excessive.

Figure 20:
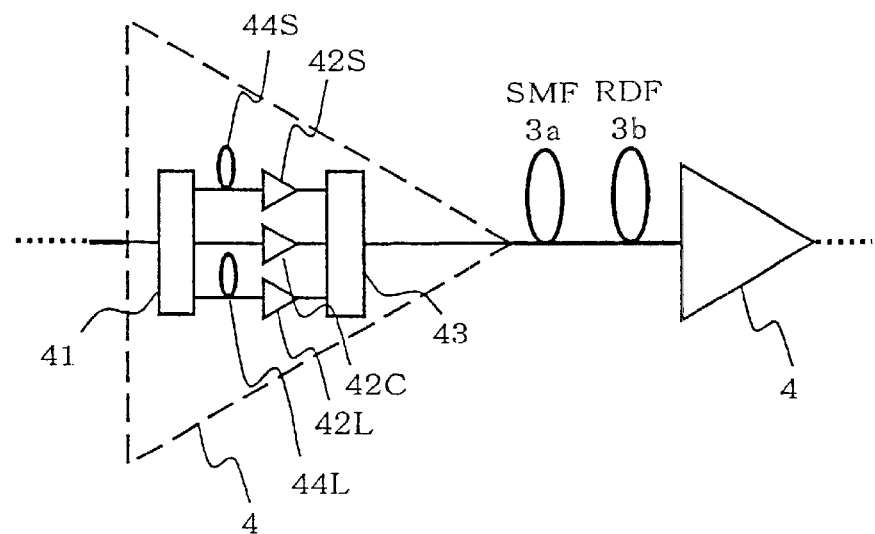
FIG. 20 is a diagram showing a specific constitutional example of an optical amplifier to be used in the fifth embodiment.

FIG. 20 is a block diagram showing a specific constitutional example of optical amplifiers 4 to be applied to this embodiment.

As shown in FIG. 20, the constitution of optical amplifier 4 to be used in this embodiment is different from that of the fourth embodiment, in that a dispersion compensation fiber 44L is inserted into a 1580-nm-band propagation path, instead of the dispersion compensation fiber 44C which has been inserted into a 1550-nm-band propagation path. Other constitution of the optical amplifier 4 is identical with that of the fourth embodiment.

Here, the dispersion compensation fiber 44L is inserted between a 1580-nm-band output port of the demultiplexer 41 and an input port of the 1580-nm-band optical amplifying part 42L. Further, the dispersion compensation fiber 44L has a positive wavelength dispersion and a positive dispersion slope corresponding to the compensation errors relative to 1580 nm band caused within the hybrid transmission path at the former stage. Concretely, as the dispersion compensation fiber 44L, it is possible to adopt an optical fiber identical with the 1.3 $\mu$m zero-dispersion SMF 3a used in the former part of the hybrid transmission path.

Figure 21:
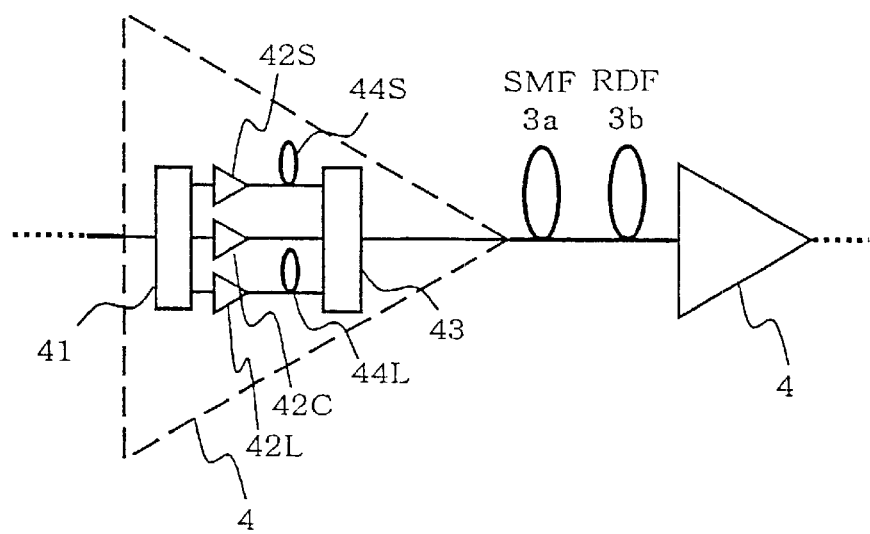
FIG. 21 is a diagram showing another specific constitutional example relating to the optical amplifier of FIG. 20.
Figure 22:
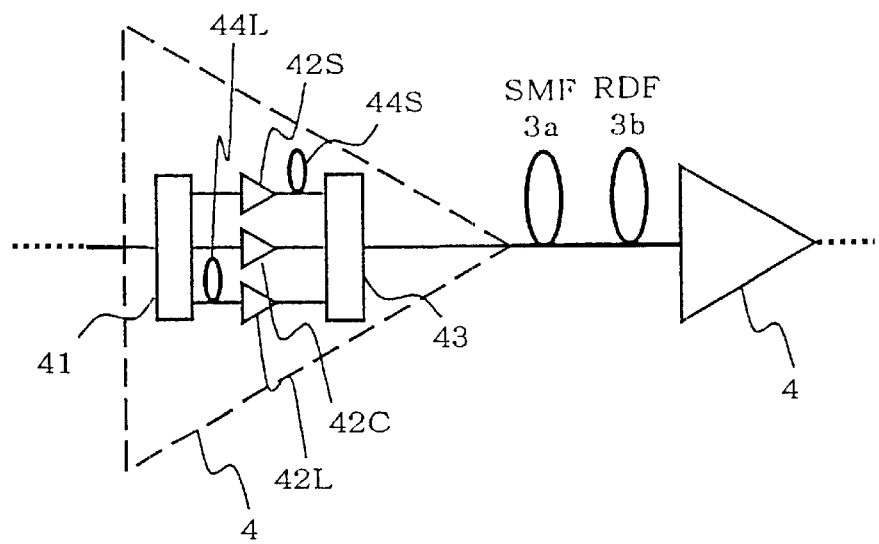
FIG. 22 is a diagram showing yet another specific constitutional example relating to the optical amplifier of FIG. 20.
Figure 23:
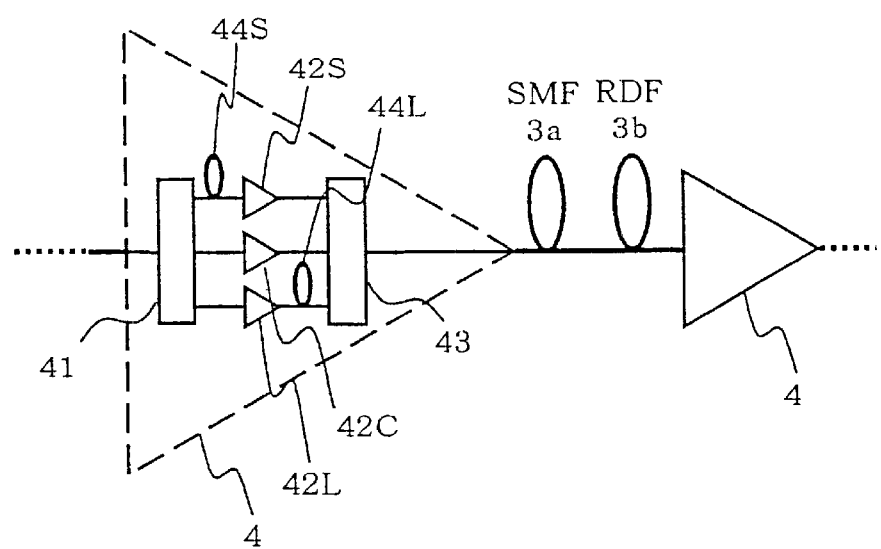
FIG. 23 is a diagram showing still another specific constitutional example relating to the optical amplifier of FIG. 20.

In the above, the dispersion compensation fibers 44S, 44L are provided at input sides of the optical amplifying parts 42S, 42L, respectively, but the present invention is not limited thereto. For example, it is possible to provide the dispersion compensation fibers 44S, 44L at output sides of the optical amplifying parts 42S, 42L, respectively, as shown in FIG. 21. Further, as shown in FIG. 22 or FIG. 23, it is possible to provide one of the dispersion compensation fibers at an input side of one of the optical amplifying parts, and the other at an output side of the other optical amplifying part.

In the fifth embodiment as constituted above, the wavelength dispersion and dispersion slope caused within the 1.3 $\mu$m zero-dispersion SMF 3a are compensated by the RDF 3b up to approximately 100% in the respective hybrid transmission paths, for WDM signal light at 1550 nm band. However, negative wavelength dispersions will remain with respect to WDM signal lights at 1520 nm band and 1580 nm band, since the compensation by the RDF 3b becomes excessive. Nonetheless, these residual wavelength dispersions at 1520 nm band and 1580 nm band are compensated by the dispersion compensation fibers 44S, 44L inserted into the respective propagation paths for 1520 nm band and 1580 nm band, so that wavelength dispersion compensations for all of three wavelength bands are assuredly performed. Further, as to 1580 nm band, there is also performed compensation for residual dispersion slope by the dispersion compensation fiber 44L.

In this way, according to the fifth embodiment, there can be obtained an effect identical with that of the fourth embodiment and compensation for the dispersion slope for 1580 nm band can be assuredly performed: by setting the wavelength dispersion characteristics of the respective optical fibers such that the wavelength dispersion and dispersion slope at 1550 nm band are compensated up to approximately 100% within hybrid transmission paths; and by providing only 1520-nm-band dispersion compensation fiber 44S and 1580-nm-band dispersion compensation fiber 44L, within optical amplifier.

There will be described hereinafter a WDM optical transmission system according to a sixth embodiment of the present invention.

In the sixth embodiment, there will be considered such a situation that the wavelength dispersion characteristics of hybrid transmission paths are set by regarding 1520 nm band as a reference wavelength band, for a WDM optical transmission system through which WDM signal lights at three wavelength bands are transmitted similarly to the above described fourth embodiment. The whole constitution of the WDM optical transmission system is identical with that of the first embodiment shown in FIG. 1.

Figure 24:
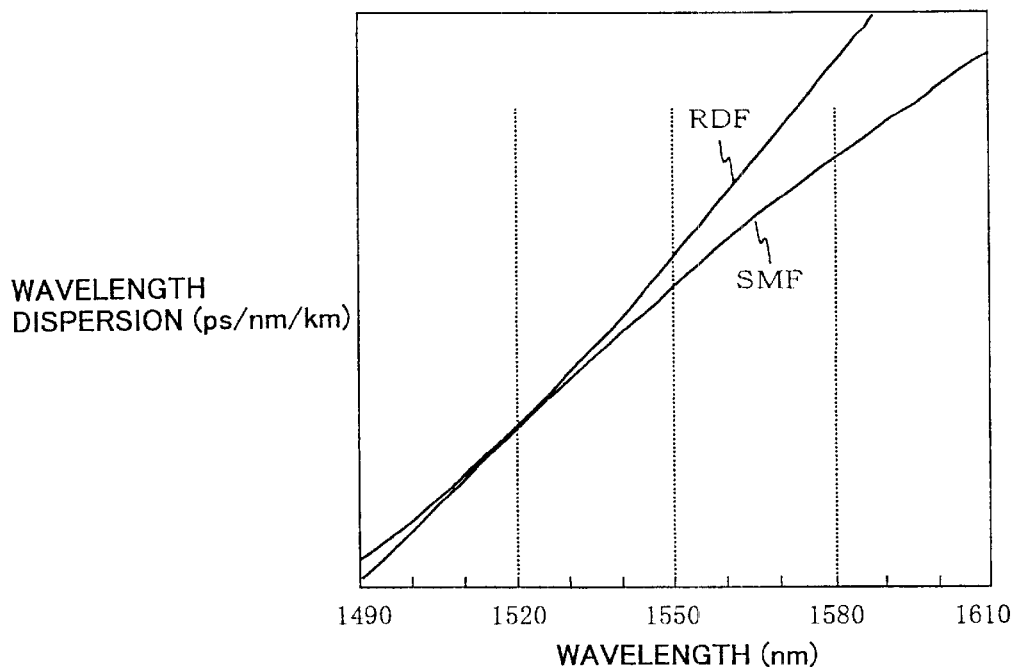
FIG. 24 is a graph showing wavelength dispersion characteristics of a hybrid transmission path to be used in a sixth embodiment according to the present invention.

FIG. 24 is a graph showing wavelength dispersion characteristics of hybrid transmission paths to be adopted in the sixth embodiment.

As shown in FIG. 24, the wavelength dispersion characteristics of the RDF 3b are set such that wavelength dispersion and dispersion slope caused within the 1.3 $\mu$m zero-dispersion SMF 3a are compensated up to approximately 100% within hybrid transmission paths of this embodiment, while treating 1520 nm as a reference. In this way, wavelength dispersion and dispersion slope are compensated up to approximately 100% at 1520 nm band, whereas negative wavelength dispersion is accumulated at 1550 nm band due to excessive wavelength dispersion compensation by the RDF 3b, and also negative wavelength dispersion is accumulated at 1580 nm band due to more excessive wavelength dispersion compensation by the RDF. Further, negative dispersion slopes are accumulated as to dispersion slopes at 1550 nm band and 1580 nm band, respectively, due to excessive compensations by the RDF 3b.

As representative values of wavelength dispersion characteristics of the 1.3 $\mu$m zero-dispersion SMF 3a at 1520 nm which is a setting basis of hybrid transmission paths, there can be mentioned 16.22 ps/nm/km for wavelength dispersion and 0.068 ps/nm$^2$/km for dispersion slope. In this case, the wavelength dispersion characteristics of the RDF 3b are set such that, at 1520 nm, its wavelength dispersion approaches −16.22 ps/nm/km and the dispersion slope approaches −0.068 ps/nm²/km as close as possible.

Figure 25:
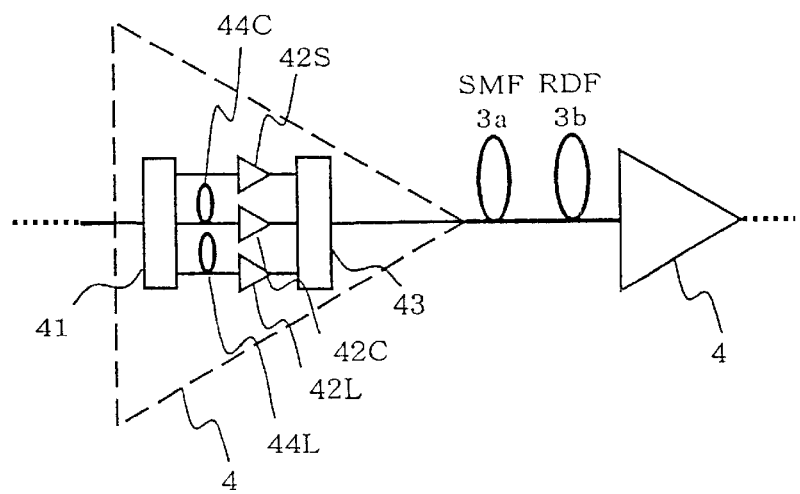
FIG. 25 is a diagram showing a specific constitutional example of an optical amplifier to be used in the sixth embodiment.

FIG. 25 is a block diagram showing a specific constitutional example of optical amplifiers 4 to be applied to this embodiment.

As shown in FIG. 25, the optical amplifier 4 to be used in this embodiment is different from that of the fourth embodiment, in that the dispersion compensation fiber 44L is inserted into a propagation path for 1580 nm band, instead of the dispersion compensation fiber 44S which has been inserted into a propagation path for 1520 nm band. The constitution of optical amplifier 4 other than the above portion is identical with that of the fourth embodiment.

The 1550-nm-band dispersion compensation fiber 44C and 1580-nm-band dispersion compensation fiber 44L have positive wavelength dispersions and positive dispersion slopes, respectively, corresponding to compensation errors relative to 1550 nm band and 1580 nm band, respectively. Concretely, it is possible to adopt, as the fibers 44C, 44L, an optical fiber identical with the 1.3 $\mu$m zero-dispersion SMF 3a to be used for the former part of hybrid transmission path.

Figure 26:
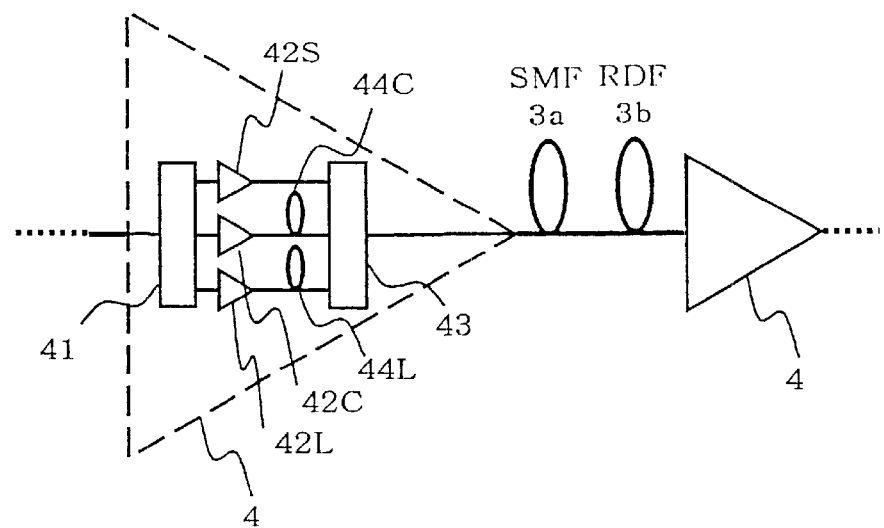
FIG. 26 is a diagram showing another specific constitutional example relating to the optical amplifier of FIG. 25.
Figure 27:
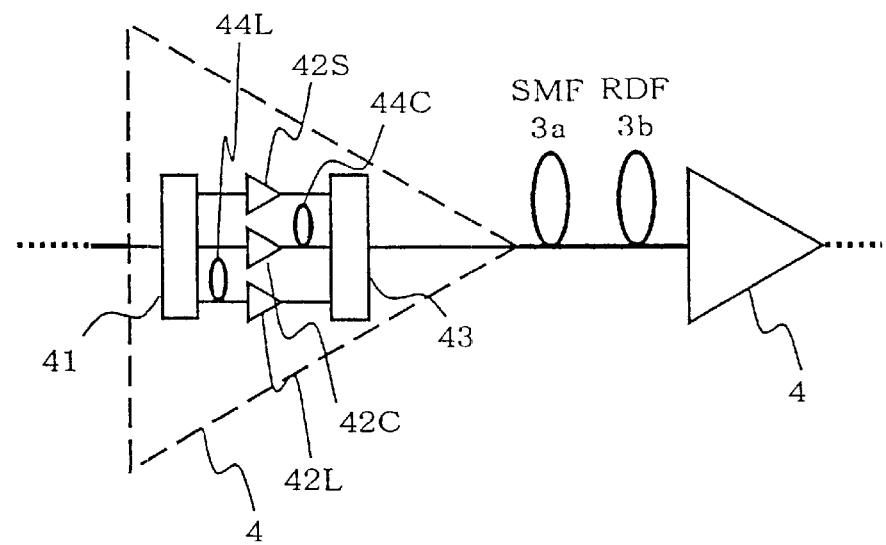
FIG. 27 is a diagram showing yet another specific constitutional example relating to the optical amplifier of FIG. 25.
Figure 28:
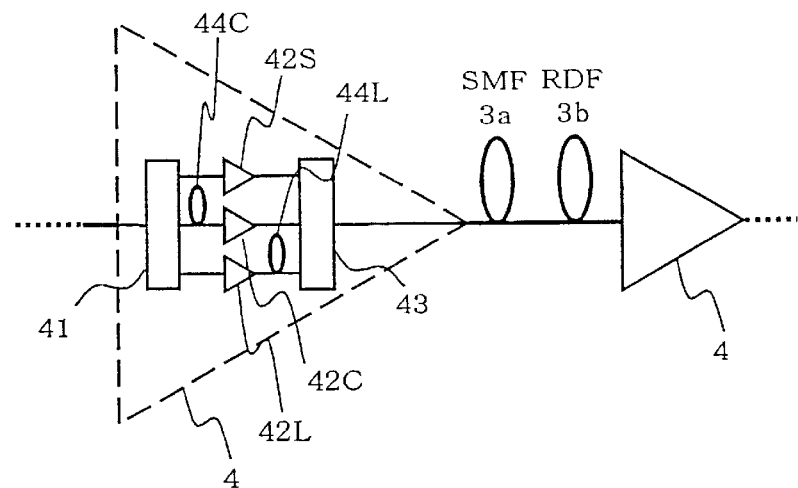
FIG. 28 is a diagram showing still another specific constitutional example relating to the optical amplifier of FIG. 25.

The dispersion compensation fibers 44C, 44L are inserted at input sides of the optical amplifying parts 42C, 42L, respectively, but the present invention is not limited thereto. For example, as shown in FIG. 26, the dispersion compensation fibers 44C, 44L may be provided at output sides of the optical amplifying parts 42C, 42L, respectively. Further, as shown in FIG. 27 or FIG. 28, it is possible to provide one of the dispersion compensation fibers at an input side of one of the optical amplifying parts, and the other at an output side of the other optical amplifying part.

In the sixth embodiment as constituted above, wavelength dispersion and dispersion slope caused within the 1.3 $\mu$m zero-dispersion SMF 3a are compensated within respective hybrid transmission paths up to approximately 100% by the RDF 3b, for WDM signal light at 1520 nm band. However, WDM signal lights at 1550 nm band and 1580 nm band have residual negative wavelength dispersions and negative dispersion slopes, due to excessive compensation by the RDF 3b. Nonetheless, these residual wavelength dispersions and dispersion slopes at 1550 nm band and 1580 nm band are compensated by the dispersion compensation fibers 44C, 44L inserted into propagation paths for 1550 nm band and 1580 nm band, respectively, in the optical amplifier 4, thereby assuring wavelength dispersion compensations and dispersion slope compensations for all of the three wavelength bands.

According to the sixth embodiment as described above, the wavelength dispersion characteristics of respective optical fibers are set such that the wavelength dispersion and dispersion slope at 1520 nm band are compensated up to approximately 100% within hybrid transmission paths, and the 1550-nm-band dispersion compensation fiber 44C and the 1580-nm-band dispersion compensation fiber 44L are provided in the optical amplifier. As a result, it becomes possible to assuredly compensate wavelength dispersions and dispersion slopes at the three wavelength bands, respectively, by a simple constitution. Thus, it becomes possible to realize a WDM optical transmission system by which dispersion compensation can be performed more assuredly with reduced cost.

There will be described hereinafter a WDM optical transmission system according to a seventh embodiment of the present invention.

In this seventh embodiment, there will be described a situation in which the wavelength dispersion characteristics of RDF 3b are set such that: wavelength dispersions for central wavelengths at 1520 nm band (shortest wavelength band) and 1580 nm band (longest wavelength band) are compensated up to approximately 100%, respectively, within hybrid transmission paths, in a WDM optical transmission system which transmits WDM signal lights at three wavelength bands of 1520 nm band, 1550 nm band and 1580 nm band.

Figure 29:
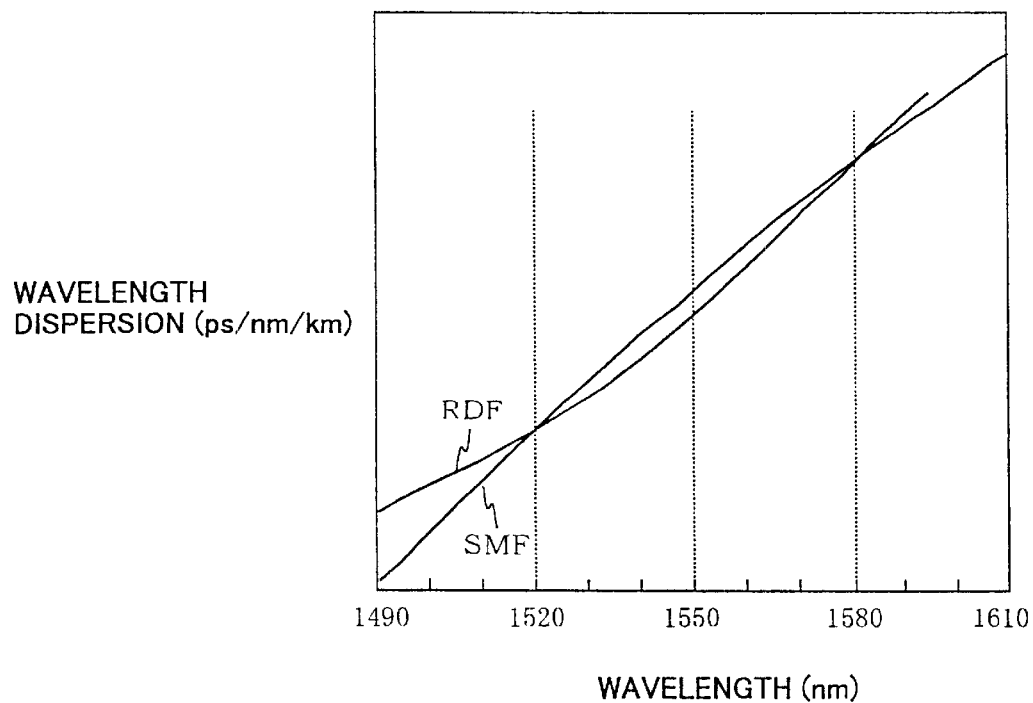
FIG. 29 is a graph showing wavelength dispersion characteristics of a hybrid transmission path to be used in a seventh embodiment according to the present invention.

FIG. 29 is a graph showing wavelength dispersion characteristics of a hybrid transmission path to be used in the seventh embodiment.

As shown in FIG. 29, in the hybrid transmission path to be used in this embodiment, the wavelength dispersion characteristics of RDF 3b are set such that the wavelength dispersions of 1.3 $\mu$m zero-dispersion SMF 3a are compensated up to approximately 100% at 1520 nm and 1580 nm, respectively. In this case, compensation by the RDF 3b is insufficient for 1550 nm band (intermediate wavelength band), thereby causing a positive wavelength dispersion as a compensation error. As to dispersion slope, there is realized approximately 100% of compensation near 1550 nm band, but slight compensation errors will be caused at 1520 nm band and 1580 nm band, respectively. Nonetheless, these compensation errors of dispersion slopes can be regarded as being such degrees that have no affections on transmission characteristics, when considering band widths (in the order of approximately 30 nm) of respective wavelength bands.

Figure 30:
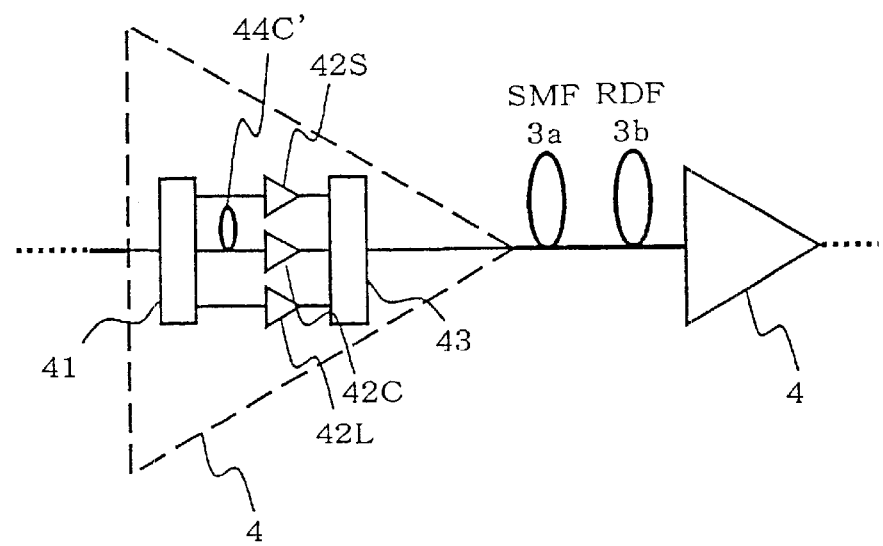
FIG. 30 is a diagram showing a specific constitutional example of an optical amplifier to be used in the seventh embodiment.

FIG. 30 is a block diagram showing a specific constitutional example of respective optical amplifiers 4 to be applied to this embodiment.

In FIG. 30, the constitution of optical amplifier 4 to be used in this embodiment is different from that of the fourth embodiment, in that only a dispersion compensation fiber 44C' is inserted into a propagation path for 1550 nm band, instead of dispersion compensation fibers 44S and 44C which have been inserted into propagation paths for 1520 nm band and 1550 nm band, respectively. Other constitution of the optical amplifier 4 is identical with that of the fourth embodiment. Thus, the optical amplifier 4 has a function as dispersion compensation device herein.

In this embodiment, the dispersion compensation fiber 44C' is inserted between a 1550-nm-band output port of the demultiplexer 41 and an input port of the 1550-nm-band optical amplifying part 42C. This dispersion compensation fiber 44C' has a negative wavelength dispersion corresponding to the positive wavelength dispersion at 1550 nm band caused within a hybrid transmission path of a former stage, and concretely, it is possible to adopt, as the dispersion compensation fiber 44C', an optical fiber identical with the RDF 3b to be used in the latter part of the hybrid transmission path.

Figure 31:
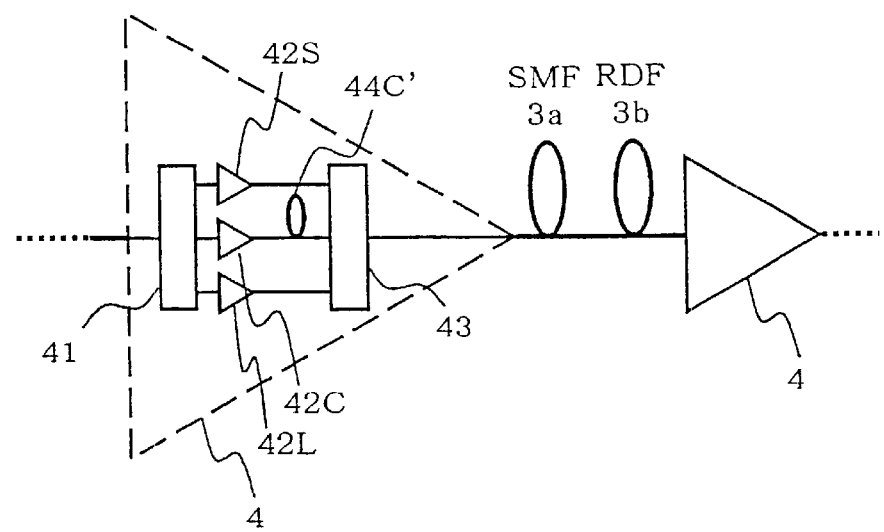
FIG. 31 is a diagram showing another specific constitutional example relating to the optical amplifier of FIG. 30.

Although the dispersion compensation fiber 44C' has been provided at the input side of the 1550-nm-band optical amplifying part 42C here, it is also possible to provide the dispersion compensation fiber 44C' between an output port of the 1550-nm-band optical amplifying part 42C and a 1550-nm-band input port of the demultiplexer 41 as shown in FIG. 31.

In the WDM optical transmission system having a constitution as described above, for 1520 nm band and 1580 nm band, wavelength dispersions caused within the 1.3 $\mu$m zero-dispersion SMF 3a are compensated by the RDF 3b up to levels having no affections on transmission characteristics, within the hybrid transmission path of each of repeating sections. However, compensation by the RDF 3b is insufficient for 1550 nm band, thereby leaving a positive wavelength dispersion. Nonetheless, this residual wavelength dispersion at 1550 nm band is compensated by the dispersion compensation fiber 44C' inserted in a propagation path for 1550 nm band within the optical amplifier 4, so that wavelength dispersion compensations for all of the three wavelength bands can be assuredly performed.

According to the seventh embodiment as described above, wavelength dispersion characteristics of hybrid transmission paths are set to compensate wavelength dispersions at wavelength bands at both ends up to approximately 100% in case of transmitting WDM signal lights at three wavelength bands. Thus, by simply providing a dispersion compensation fiber corresponding the intermediate wavelength band within each of optical amplifiers, it becomes possible to assuredly compensate wavelength dispersions and dispersion slopes at the three wavelength bands. In this way, it becomes possible to realize further simplification and lower cost of an optical amplifier constituting a WDM optical transmission system.

In the above seventh embodiment, the compensation errors of dispersion slopes at the wavelength bands at both ends have been treated as being in such an extent that the same have no affections on the transmission characteristics. However, in case of a system where such compensation errors are problematic, it is possible to separately provide a device for compensating such errors.

In the above first through seventh embodiments, there have been described such situations where the WDM signal light to be transmitted includes two wavelength bands or three wavelength bands. However, the present invention is not limited to such situations, and can be also applied to a situation where WDM signal light includes four or more wavelength bands, in a manner identical with the above described embodiments.

There will be described hereinafter a WDM optical transmission system according to an eighth embodiment of the present invention.

Figure 32:
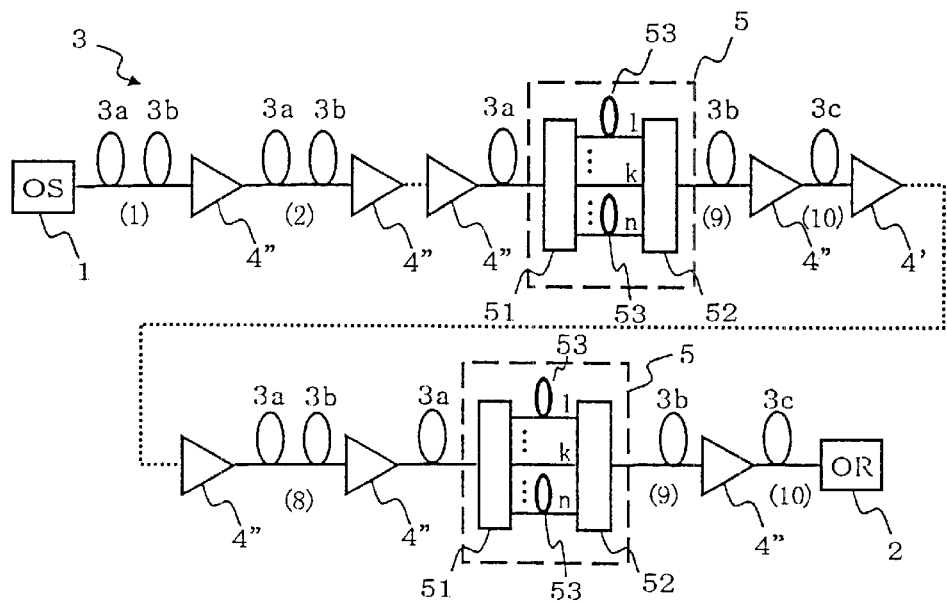
FIG. 32 is a block diagram showing a system constitution of an eighth embodiment according to the present invention.

FIG. 32 is a block diagram showing a whole constitution of a WDM optical transmission system according to the eighth embodiment.

In this WDM optical transmission system as shown in FIG. 32, wavelength dispersion characteristics of a hybrid transmission path to be adapted for each of repeating sections are set regarding a k-th wavelength band as a reference such as in case that WDM signal lights including n-wavelength bands are transmitted. Further, a compensation error caused within each of hybrid transmission paths is compensated by a dispersion compensator 5 inserted on the way of the optical transmission path 3.

As concretely compared with the system constitution shown in FIG. 6, this embodiment has such differences therefrom that: optical amplifier 4" without dispersion compensation fibers in propagation paths for respective wavelength bands is arranged for each of repeating sections, instead of the optical amplifier 4 which has been provided with the dispersion compensation fiber; and dispersion compensators 5 for compensating wavelength dispersions and dispersion slopes caused within hybrid transmission paths are provided on the way of the optical transmission path 3 at predetermined intervals. System constitution other than the above is identical with that shown in FIG. 6.

In the above, in respective hybrid transmission paths, wavelength dispersion characteristics of the RDF 3b are set such that wavelength dispersions and dispersion slopes caused within 1.3 μm zero-dispersion SMF's 3a are compensated up to approximately 100% for a k-th wavelength band as a reference wavelength band. As such, wavelength dispersion compensations by the RDF 3b become excessive for those wavelength bands except for the k-th wavelength band, so that negative wavelength dispersions are accumulated. For dispersion slope, positive dispersion slopes are accumulated at wavelength bands at a shorter wavelength side of the k-th wavelength band due to insufficient compensation by the RDF 3b, while negative dispersion slopes are accumulated at wavelength bands at a longer wavelength side of the k-th wavelength band due to excessive compensation by the RDF 3b.

Each of optical amplifiers 4" includes optical amplifying parts such as corresponding to n-wavelength bands (not shown), respectively, such that input WDM signal lights are demultiplexed into respective wavelength bands, amplified up to desired levels, and then multiplexed again for output.

Each of dispersion compensators 5 is constituted of: a demultiplexer 51 for demultiplexing WDM signal lights input from the optical transmission path 3, into n-wavelength bands, respectively; a multiplexer 52 for multiplexing the demultiplexed WDM signal lights at respective wavelength bands, to thereby output the thus multiplexed WDM signal lights onto the optical transmission path 3; and (n−1) dispersion compensation fibers 53 to be inserted into propagation paths corresponding to wavelength bands, respectively, among n-propagation paths other than a propagation path corresponding to the k-th wavelength band between the demultiplexer 51 and multiplexer 52.

This dispersion compensator 5 is inserted into the optical transmission path 3 at intervals of every 10 repeating sections, such as identical with the insertion interval of the above described dispersion compensation fiber 3c (which is the optical fiber for compensating accumulated wavelength dispersions caused within the hybrid transmission paths, commonly to the respective wavelength bands). Concretely, the dispersion compensator 5 shall be inserted between the 1.3 μm zero-dispersion SMF 3a and RDF 3b at every 9-th repeating section. Note, the insertion interval is not limited to the above, and can be set appropriately.

The dispersion compensation fibers 53 corresponding to wavelength bands, respectively, except for the k-th wavelength band, have positive wavelength dispersions and positive dispersion slopes corresponding to compensation errors (negative wavelength dispersions and negative dispersion slopes corresponding to respective wavelength bands) accumulated within the 9 threads of hybrid transmission paths within the corresponding 10 repeating sections.

In the eighth embodiment having such a constitution as described above, there are compensated by the RDF 3b wavelength dispersions and dispersion slopes caused within the 1.3 μm zero-dispersion SMF's 3a over 9 threads of hybrid transmission paths within 10 repeating sections, up to approximately 100% with respect to WDM signal light of the k-th wavelength band. However, compensations by RDF's 3b for WDM signal lights at the remaining wavelength bands become excessive, so that negative wavelength dispersions will be accumulated. Nonetheless, these compensation errors accumulated within the respective hybrid transmission paths are compensated by the dispersion compensation fibers 53 corresponding to the respective wavelength band within the dispersion compensator 5. Thus, there can be assuredly performed wavelength dispersion compensations for all of the n-wavelength bands. Further, dispersion slopes can be also compensated by corresponding dispersion compensation fibers 53, respectively, for those wavelength bands at a longer wavelength side of the k-th wavelength band.

In this way, according to the eighth embodiment, it becomes possible by a simple constitution to assuredly compensate wavelength dispersions for n-wavelength bands (dispersion slopes can be also compensated, as to a longer wavelength side of a reference wavelength band), by setting wavelength dispersion characteristics of hybrid transmission paths by treating the k-th wavelength band as a reference, to thereby compensate compensation errors caused within hybrid transmission paths, by means of dispersion compensators 5 inserted on the way of optical transmission path 3.

The fact that compensation errors caused within hybrid transmission paths are to be compensated not by optical amplifiers but by the dispersion compensators 5, has an advantage that: it is easy to adjust dispersion compensation amounts at dispersion compensators 5 for each of wavelength bands upon construction, for such a situation that errors have occurred between a designed system and an actually constructed system.

Figure 33:
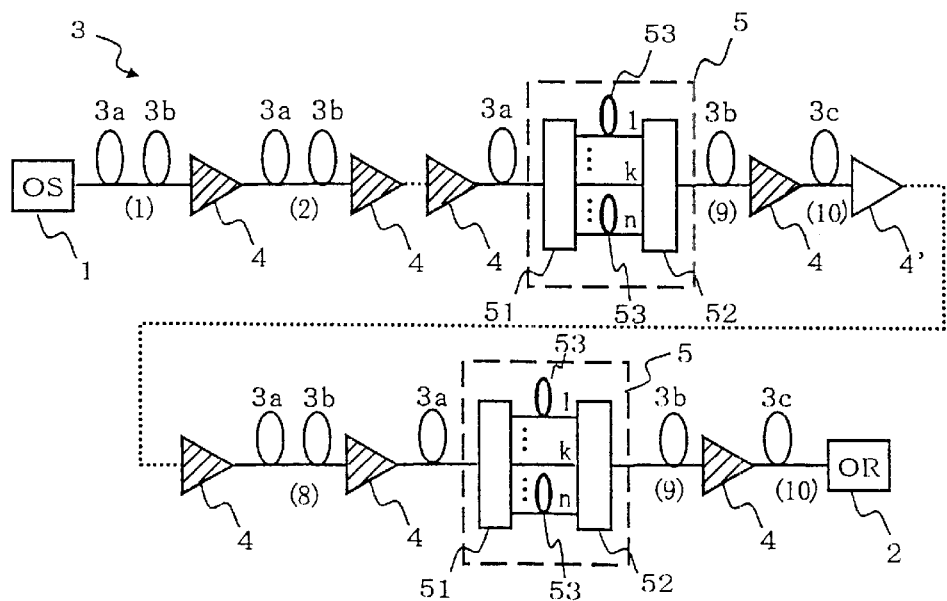
FIG. 33 is a block diagram showing another example of system constitution relating to the eighth embodiment.
Figure 34:
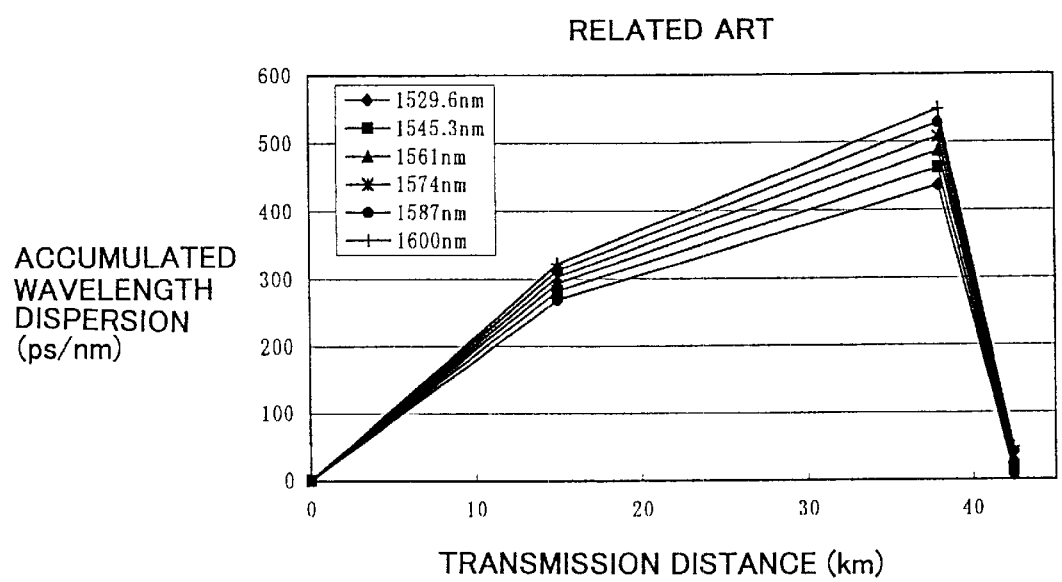
FIG. 34 is a graph showing a result obtained by calculating wavelength dispersions caused in a hybrid transmission path in a conventional system.

In the eighth embodiment, there have been adopted the optical amplifier 4" without dispersion compensation fibers in propagation paths for respective wavelength bands. However, it is possible to adopt such a constitution which is obtained by combining anyone of the above described fourth through sixth embodiments and the eighth embodiment, i.e., such a constitution in which compensation errors caused within hybrid transmission paths are compensated by both of optical amplifiers 4 and dispersion compensators 5. An example of system constitution for such a situation is shown in FIG. 33. According to such a constitution, it becomes possible to compensate those wavelength dispersions, which still remain even when wavelength dispersions are compensated for each of wavelength bands such as within optical amplifiers 4, by dispersion compensators 5 to thereby further improve precision of wavelength dispersion compensation.

In the first through eighth embodiments, there have been described situations where dispersion compensation fiber such as 1.3 μm zero-dispersion SMF such as within optical amplifier is adopted as a device for compensating wavelength dispersion and dispersion slope caused within hybrid transmission path. However, the present invention is not limited thereto. For example, other than dispersion compensation fibers, there are known dispersion compensators utilizing fiber grating, and ones of waveguide path type.

Concretely, as a dispersion compensator adopting a fiber grating, it is possible to apply those techniques such as proposed in an article "FIBER BRAGG GRATINGS FOR DISPERSION COMPENSATION, OECC '97, 9D1-1, 1997" of Richard I. Laming et al., and another article "Fabrication of Fiber Bragg Gratings For Dispersion Compensation, Electronic Information Communication Academy Electronics Society Congress, C-3-47, 1998" of Sudo et al. Further, as a dispersion slope compensator adopting a fiber grating, it is possible to apply a technique for constituting a higher order dispersion compensator utilizing two types of non-linear chirp fiber gratings such as shown in an article "Higher order dispersion compensation using non-linear chirped fiber Bragg gratings, Electronic Information Communication Academy General Congress, C-3-39, 1998" of Komukai et al.

As a dispersion compensator of waveguide path type, it is possible to apply a technique to adopt hybrid cores having refractive indices largely different from each other to thereby utilize connection between the cores, such as shown in an article "Dispersion Equalizer with Planar Lightwave Circuits, Electronic Information Communication Academy Electronics Society Congress, C-3-83, 1998" of Uetsuka et al. Further, as a dispersion slope compensator of waveguide path type, it is possible to apply a technique such as proposed in an article "Dispersion Slope Equalizer for Dispersion Shifted Fiber Using a Lattice-Form Programmable Optical Filter on a Planar Lightwave Circuit, Journal of Lightwave Tech., vol. 16, no. 9, September 1998" of K. Takiguchi et al.

Further, in each of the above described embodiments, dispersion compensation has been performed by treating each of a plurality of wavelength bands, as one unit. However, it is possible to use such an adaptation which divides one wavelength band into a plurality of wavelength widths, and performs a dispersion compensation for each of the wavelength widths. Concretely, it is possible to treat a 1550 nm band by dividing it such as into two wavelength widths of from 1545 to 1550 nm and from 1550 to 1560 nm.

What we claimed are:

1. A wavelength division multiplexing optical transmission system transmitting wavelength division multiplexed signal light including a plurality of wavelength bands, comprising:

an optical transmission path comprising a first transmission section provided, by connecting:

a first optical fiber having positive wavelength dispersions and positive dispersion slopes relative to said plurality of wavelength bands, respectively; and a second optical fiber having negative wavelength dispersions and negative dispersion slopes relative to said plurality of wavelength bands, respectively;

said first transmission section having wavelength dispersion characteristics set such that compensation ratios by said second optical fiber for wavelength dispersions and dispersion slopes caused within said first optical fiber become maximum for a reference wavelength band which is one of said plurality of wavelength bands; and dispersion compensation means capable of compensating wavelength dispersions caused within said first transmission section of said optical transmission path, for said plurality of wavelength bands except for said reference wavelength band.

2. The wavelength division multiplexing optical transmission system of claim 1, wherein said dispersion compensation means comprises:

a demultiplexing part for demultiplexing wavelength division multiplexed signal lights sent from said optical transmission path, into said plurality of wavelength bands, respectively, a multiplexing part for multiplexing said wavelength division multiplexed signal lights demultiplexed by said demultiplexing part, so as to output the thus multiplexed signal lights onto said optical transmission path, and dispersion compensation parts inserted on those propagation paths, respectively, for said plurality of wavelength bands except for said reference wavelength band, which propagation paths are positioned between said demultiplexing part and said multiplexing part, said dispersion compensation parts being capable of compensating wavelength dispersions caused within said first transmission section relative to corresponding wavelength bands of said plurality of wavelength bands, respectively.

3. The wavelength division multiplexing optical transmission system of claim 1, further comprising an optical amplifier amplifying wavelength division multiplexed signal lights propagated through said optical transmission path, for said plurality of wavelength bands, respectively;

wherein said dispersion compensation means is disposed within said optical amplifier.

4. The wavelength division multiplexing optical transmission system of claim 1, wherein wavelength dispersion characteristics of said first transmission section of said optical transmission path are set such that said compensation ratios by said second optical fiber for wavelength dispersion and dispersion slope caused within said first optical fiber, become approximately 100% for said reference wavelength band.

5. The wavelength division multiplexing optical transmission system of claim 1, wherein wavelength dispersion characteristics of said first transmission section of said optical transmission path, are set such that wavelength dispersions caused within said first optical fiber are excessively compensated by said second optical fiber, so that negative wavelength dispersions remain for said plurality of wavelength bands;

wherein said optical transmission path further comprises a second transmission section adopting a third optical fiber having positive wavelength dispersions for said plurality of wavelength bands, respectively; and wherein negative wavelength dispersions remaining within said first transmission section are compensated by said second transmission section.

6. The wavelength division multiplexing optical transmission system of claim 1, wherein said plurality of wavelength bands includes at least two of a 1520 nm band, a 1550 nm band and a 1580 nm band.

7. The wavelength division multiplexing optical transmission system of claim 1, wherein said second optical fiber in said first transmission section of said optical transmission path has a length ratio between 20% and 40% of said first transmission section.

8. A wavelength division multiplexing optical transmission system transmitting wavelength division multiplexed signal light including a plurality of wavelength bands, comprising:

an optical transmission path comprising a first transmission section provided by connecting:
a first optical fiber having positive wavelength dispersions and positive dispersion slopes relative to said plurality of wavelength bands, respectively; and
a second optical fiber having negative wavelength dispersions and negative dispersion slopes relative to said plurality of wavelength bands, respectively;
said first transmission section having wavelength dispersion characteristics set such that compensation ratios by said second optical fiber for wavelength dispersions caused within said first optical fiber become approximately 100% for a central wavelength of a shortest wavelength band and for a central wavelength of a longest wavelength band of said plurality of wavelength bands, respectively.

9. The wavelength division multiplexing optical transmission system of claim 8, further comprising:

dispersion compensation means for compensating wavelength dispersions caused within said first transmission section of said optical transmission path, for intermediate wavelength bands positioned between said shortest wavelength band and said longest wavelength band.

10. The wavelength division multiplexing optical transmission system of claim 9, wherein said dispersion compensation means comprises:

a demultiplexing part for demultiplexing wavelength division multiplexed signal lights sent from said optical transmission path, into said plurality of wavelength bands, respectively, a multiplexing part for multiplexing said wavelength division multiplexed signal lights demultiplexed by said demultiplexing part, so as to output the thus multiplexed signal lights onto said optical transmission path, and dispersion compensation parts inserted on those propagation paths, respectively, for said intermediate wavelength bands, which propagation paths are positioned between said demultiplexing part and said multiplexing part, said dispersion compensation parts compensating wavelength dispersions caused within said first transmission section.

11. The wavelength division multiplexing optical transmission system of claim 9, further comprising:

an optical amplifier amplifying wavelength division multiplexed signal lights propagated through said optical transmission path, for said plurality of wavelength bands, respectively;

wherein said dispersion compensation means is disposed within said optical amplifier.

12. The wavelength division multiplexing optical transmission system of claim 8, wherein said plurality of wavelength bands includes at least two of a 1520 nm band, a 1550 nm band and a 1580 nm band.

13. The wavelength division multiplexing optical transmission system of claim 8, wherein said second optical fiber in said first transmission section of said optical transmission path has a length ratio between 20% and 40% of said first transmission section.

14. A wavelength division multiplexing optical transmission system transmitting wavelength division multiplexed signal light including a plurality of wavelength bands, comprising:

an optical transmission path comprising a first transmission section provided by connecting:
a first optical fiber having positive wavelength dispersions and positive dispersion slopes relative to said plurality of wavelength bands, respectively; and
a second optical fiber having negative wavelength dispersions and negative dispersion slopes relative to said plurality of wavelength bands, respectively;
said first transmission section having wavelength dispersion characteristics set such that compensation ratios by said second optical fiber for wavelength dispersions caused within said first optical fiber become maximum for a reference wavelength band which is one of said plurality of wavelength bands; and dispersion compensation means capable of compensating wavelength dispersions caused within said first transmission section of said optical transmission path, for said plurality of wavelength bands, respectively, except for said reference wavelength band.

15. The wavelength division multiplexing optical transmission system of claim 14, wherein said plurality of wavelength bands includes at least two of a 1520 nm band, a 1550 nm band and a 1580 nm band.

16. The wavelength division multiplexing optical transmission system of claim 14, wherein said second optical fiber in said first transmission section of said optical transmission path has a length ratio between 20% and 40% of said first transmission section.

17. An optical amplifier amplifying wavelength division multiplexed signal light including a plurality of wavelength bands, comprising:

a demultiplexing part separating wavelength division multiplexed signal lights from an optical transmission path, corresponding to respective wavelengths;

optical amplifying parts amplifying said lights of said respective wavelengths separated by said demultiplexing part;

dispersion compensation parts performing dispersion compensations corresponding to wavelength dispersion values of said lights of said respective wavelengths separated by said demultiplexing part; and a multiplexing part wavelength-division multiplexing said lights of said respective wavelengths, which lights have been treated by said optical amplifying part and by said dispersion compensation parts, respectively;

wherein said optical transmission path comprises a first transmission section provided, by connecting:

a first optical fiber having positive wavelength dispersions and positive dispersion slopes relative to said plurality of wavelength bands respectively; and a second optical fiber having negative wavelength dispersions and negative dispersion slopes relative to said plurality of wavelength bands, respectively;

said first transmission section having wavelength dispersion characteristics set such that compensation ratios by said second optical fiber for wavelength dispersions and dispersion slopes caused within said first optical fiber become maximum for a reference wavelength band which is one of said plurality of wavelength bands; and said dispersion compensation parts capable of compensating wavelength dispersions caused within said first transmission section of said optical transmission path, for said plurality of wavelength bands except for said reference wavelength band.

18. The optical amplifier of claim 17, wherein said demultiplexing part separates wavelength division multiplexed signal lights from said optical transmission path, at wavelength widths corresponding to amplification bands of said optical amplifying parts, respectively.

19. A wavelength division multiplexing optical transmission system comprising:

an optical transmission path through which wavelength division multiplexed signal light including a plurality of wavelengths for communication is transmitted, said optical transmission path comprising:

a first optical fiber having positive wavelength dispersions and positive dispersion slopes relative to said plurality of wavelengths, respectively; and a second optical fiber having negative wavelength dispersions and negative dispersion slopes relative to said plurality of wavelengths, respectively;

said first optical fiber and said second optical fiber having wavelength dispersion characteristics set such that compensation ratios by said second optical fiber for wavelength dispersion and dispersion slope caused within said first optical fiber become maximum for a reference wavelength which is one of said plurality of wavelengths; and dispersion compensation means capable of compensating wavelength dispersions caused within said optical transmission path, for each of predetermined wavelength widths for said plurality of wavelengths exclusive of said reference wavelength, respectively.

20. A wavelength division multiplexing optical transmission system transmitting wavelength division multiplexed signal light including a plurality of wavelength, bands, comprising:

an optical transmission path including a transmission section formed by connecting first and second optical fibers, said transmission section having wavelength dispersion characteristics set such that compensation ratios by said second optical fiber for wavelength dispersions and dispersion slopes caused within said first optical fiber become maximum for a reference wavelength band which is one of the plurality of wavelength bands; and a dispersion compensator capable of compensating wavelength dispersions caused within said transmission section, for the plurality of wavelength bands except for the reference wavelength band.

21. A method for transmitting wavelength division multiplex signal light including a plurality of wavelength bands, comprising:

transmitting wavelength division multiplexed signal light including the plurality of wavelength bands on an optical transmission path formed by first and second optical fibers;

setting wavelength dispersion characteristics of the optical transmission path such that compensation ratios by the second optical fiber for wavelength dispersions and dispersion slopes caused within the first optical fiber become maximum for a reference wavelength band which is one of the plurality of wavelength bands; and compensating wavelength dispersions caused within the optical transmission path, for the plurality of wavelength bands except for the reference wavelength band.

* * * * *